United States Patent
Carr

(10) Patent No.: US 6,948,717 B1
(45) Date of Patent: Sep. 27, 2005

(54) JOINT ASSEMBLY EMPLOYING MULTI-RING GASKET

(75) Inventor: Ronald L. Carr, Kelso, WA (US)

(73) Assignee: KC Multi-Ring Products, Inc., Castle Rock, WA (US)

(*) Notice: Subject to any disclaimer, the term of this patent is extended or adjusted under 35 U.S.C. 154(b) by 653 days.

(21) Appl. No.: 08/952,001

(22) PCT Filed: Jul. 13, 1994

(86) PCT No.: PCT/US94/08087

§ 371 (c)(1),
(2), (4) Date: Nov. 7, 1997

(87) PCT Pub. No.: WO96/02787

PCT Pub. Date: Feb. 1, 1996

(51) Int. Cl.⁷ .............................................. F16L 17/06
(52) U.S. Cl. ..................... 277/609; 277/616; 277/626; 277/627
(58) Field of Search ................................ 277/608, 602, 277/609, 612, 616, 626, 627; 285/910, 363

(56) References Cited

U.S. PATENT DOCUMENTS

| | | | |
|---|---|---|---|
| 11,858 A | 10/1854 | Evarts | |
| 480,643 A * | 8/1892 | Welsh | 277/626 X |
| 605,891 A * | 6/1898 | Merwarth | 277/608 X |
| RE11,858 E * | 9/1900 | Merwarth | |
| 695,174 A | 3/1902 | Roller | |
| 925,770 A | 6/1909 | Herrick | |
| 1,245,002 A * | 10/1917 | Mastin | 277/626 X |
| 1,869,577 A * | 8/1932 | Oberhuber | 277/626 X |
| 1,942,704 A * | 1/1934 | Hubbard et al. | 277/609 X |
| 2,442,312 A | 5/1948 | Price | |
| 2,474,790 A | 6/1949 | Rossman | |
| 2,532,891 A | 12/1950 | Chupp | |
| 2,871,035 A | 1/1959 | Kaiser | |
| 3,108,818 A | 10/1963 | Furstenburg | |
| 3,141,686 A | 7/1964 | Smith et al. | |
| 3,214,201 A | 10/1965 | Fonda | |
| 3,302,953 A | 2/1967 | Glasgow | |
| 3,387,867 A | 6/1968 | Rogers | |
| 3,398,978 A | 8/1968 | Gasche | |
| 3,573,870 A | 4/1971 | Gastubeau | |
| 3,620,554 A | 11/1971 | Ward et al. | |
| 3,656,769 A * | 4/1972 | Jelinek et al. | 285/363 |
| 3,781,043 A | 12/1973 | Hagmann | |
| 4,002,344 A * | 1/1977 | Smith | 277/11 |

(Continued)

FOREIGN PATENT DOCUMENTS

FR 342721 4/1904

(Continued)

Primary Examiner—Alison K. Pickard
(74) Attorney, Agent, or Firm—Birdwell & Janke, LLP

(57) ABSTRACT

A multi-ring gasket (140) is for sealing the joint between two flanged general non-metallic pipes. In one embodiment, the gasket has an inner ring (72) an outer ring (132) and a plurality of spokes (77) connecting the inner ring (72) to the outer ring (132). The various gasket embodiments have additional features, including having a substantially in-set outermost ring (132) so that the gasket (140) may be used with a flange having a mating surface interior of the bolts employed to draw the flanges together; having spokes (96) that do not encircle the bolts but that provide for aligning the gasket with respect to the bolts and the flanges; having an outer periphery (102) that is at least partially rectilinear; having one or more peripheral notches (112) for receiving a thickness gauge; and having a tab (144) for manipulating the gasket (140) in the installation thereof.

36 Claims, 16 Drawing Sheets

U.S. PATENT DOCUMENTS

| | | | | |
|---|---|---|---|---|
| 4,269,417 | A | * | 5/1981 | Dutton ........................ 277/11 |
| 4,272,085 | A | | 6/1981 | Fujikawa et al. |
| 4,388,259 | A | | 6/1983 | Jewell et al. |
| 4,516,784 | A | | 5/1985 | Merz |
| 4,575,917 | A | * | 3/1986 | Kana et al. .................... 29/520 |
| 4,581,824 | A | * | 4/1986 | Wilkins et al. ............... 30/310 |
| 4,756,561 | A | | 7/1988 | Kawata et al. |
| 4,767,138 | A | | 8/1988 | Schafbuch |
| 4,778,189 | A | | 10/1988 | Udagawa |
| 5,052,699 | A | * | 10/1991 | Tucker ....................... 277/178 |
| 5,090,871 | A | | 2/1992 | Story et al. |
| 5,244,162 | A | * | 9/1993 | Bruce ....................... 242/56 R |
| 5,362,115 | A | * | 11/1994 | Carr ........................... 285/363 |
| 5,366,257 | A | * | 11/1994 | McPherson et al. ... 285/148.11 |
| 5,403,532 | A | * | 4/1995 | Stecher et al. .............. 264/219 |
| 5,472,214 | A | * | 12/1995 | Wainer et al. ................ 277/11 |
| 5,581,019 | A | * | 12/1996 | Minor et al. ................... 73/115 |
| 5,749,607 | A | * | 5/1998 | Carr ............................ 285/93 |

FOREIGN PATENT DOCUMENTS

| | | |
|---|---|---|
| FR | 1125110 | 4/1955 |
| FR | 1445449 | 5/1965 |
| GB | 547375 | 8/1942 |
| GB | 1061419 | 3/1967 |
| GB | 9149 | 5/2000 |

* cited by examiner

US 6,948,717 B1

JOINT ASSEMBLY EMPLOYING MULTI-RING GASKET

BACKGROUND OF THE INVENTION

This invention relates to flanged pipe joint assemblies, and particularly to gaskets for sealing the joint between two pipes of a flanged pipe assembly, assemblies employing such gaskets, and assemblies which permit monitoring and control of the quality of the seal provided by such gaskets.

In the construction of industrial facilities, such as pulp and paper mills and chemical plants, there is usually a need to employ pipe to convey fluids and fluid-like mixtures throughout the facility. Since these materials are typically reactive, modern practice favors the use of polyvinylchloride ("PVC"), chlorinated polyvinylchloride ("CPVC"), fiberglass-reinforced plastic ("FRP") polyvinylidene fluoride ("PVDF"), polypropylene ("PP") or other essentially chemically inert, generally nonmetallic pipe.

The pipe used in such facilities includes flanges at the ends of the pipe sections for assembling sections of pipe together at a joint, as is commonly understood in the art. Typically, a gasket is placed between the flanges, and the flanges are forcibly held together by bolts inserted through apertures disposed in the flanges and gaskets, or around the gaskets. When the flanges are forcibly drawn together by the bolts, uneven stress distributions around the flange tend to weaken, and ultimately break, the flanges. While PVC, CPVC, FRP, PVDF, PP and other nonmetallic pipe used in such installations have the advantage of durability in the caustic and acidic environments of the reactive materials which flow through the pipes, their flanges are particularly susceptible to breakage due to uneven stress distributions.

The gasket provides a seal between the flanges of the pipe sections to contain within the pipe the reactive materials conveyed therethrough. However, gaskets generally allow some fugitive emissions of the reactive materials from the pipe. Moreover, gaskets tend to degrade over time, and ultimately fail, which can lead to substantial fugitive emissions. To minimize fugitive emissions, joint assemblies are typically monitored regularly on an assembly-by-assembly basis. In addition, laws and regulations increasingly limit the release into the environment of fugitive emissions of a wide variety of materials and require the monitoring of such emissions. Such laws and regulations typically impose significant fines and other sanctions for failure to comply therewith.

Accordingly, there is a need for a flanged, plastic pipe joint assembly which employs a gasket that, when the flanges are forcibly drawn together, minimizes the uneven distribution of stress around the flanges so as to minimize the likelihood of damage thereto and which controls fugitive emissions and allows for monitoring the release of fugitive emissions, either on a regular or continuous basis.

SUMMARY OF THE INVENTION

The present invention meets the aforementioned need for an improved flanged plastic pipe joint assembly by providing a gasket made of a substantially flat, chemically inert material which, in one embodiment, has an inner ring disposed adjacent the pipe opening in the flange, an outer ring disposed adjacent the outer periphery of the flange and a plurality of spokes joining the inner ring to the outer ring. The flanges are forcibly drawn together by a plurality of bolts typically disposed around the flanges and in apertures therethrough. A spoke is provided for each of the bolts, the spokes themselves having respective apertures for receiving the bolts. The remainder of the space between the flanges preferably is void; that is, preferably no gasket material exists in that remaining space. However, more than two rings may be used, and a portion of gasket material thinner than the rings and spokes may be disposed in the space between the rings and the spokes.

In another embodiment, at least one flange of the joint assembly has an annular groove disposed in an inside surface of the flange adjacent the gasket, between the gasket's inner ring and outer ring. The flange also has a channel therethrough in communication with the groove and, by means of a port, with an outside surface of the flange. The port, preferably has predetermined dimensions so as to allow insertion therein of a fitting through which fluids or other materials may be selectively transmitted or detected, or both, by a tapping mechanism.

Other gasket embodiments introduce additional features, including having three rings so that the gasket may be used with more than one size of flange; having a substantially inset outermost ring so that the gasket may be used with a flange having a mating surface interior of the bolts employed to draw the flanges together; having spokes that do not encircle the bolts but that provide for aligning the gasket with respect to the bolts and the flanges that the bolts hold together; having shelves adjacent the spokes so as to align the gasket with more than one size flange; having an outer periphery that is at least partially rectilinear; having one or more peripheral notches for receiving a thickness gauge so that, when the gasket is installed, the spacing between two opposed flanges may be measured so as to determine the compression of the gasket; and having a tab for manipulating the gasket in the installation thereof.

Accordingly, it is a principle object of the present invention to provide a novel and improved flanged pipe joint assembly and a novel and improved gasket for use in the assembly.

It is another object of the present invention to provide such a gasket that minimizes the uneven distribution of stress around the flanges from the forcible drawing together of the flanges by fasteners.

It is a further object of the present invention to provide such a gasket wherein a portion of the space between two adjoining flanges of respective pipes at the junction thereof is substantially unoccupied by gasket material.

It is yet another object of the present invention to provide such a joint assembly that provides for detection and control of fugitive emissions in the joint assembly.

It is yet a further object of the present invention to provide such a joint assembly that provides for monitoring releases of fugitive emissions into the environment by detecting fugitive emissions in the joint assembly.

It is another object of the present invention to provide such a joint assembly that provides for selectively introducing inert gas to pressurize the gasket assembly and, thereby, prevent fugitive emissions from leaving the pipe.

It is a further object of the present invention to provide such a joint assembly that selectively removes fugitive emissions that are detected in the joint assembly, minimizing release thereof into the environment.

It is yet another object of the present invention to provide a gasket for use in a joint assembly wherein the mating surfaces of the flanges are of different outer diameters, so as to join the pipes on center to maximize laminar flow.

It is yet a further object of the present invention to provide a gasket that can be used with flanges of different outer diameters.

It is another object of the present invention to provide a gasket that may be used with a flange having a mating surface that is interior of the bolts that hold flanges together.

It is a further object of the present invention to provide a gasket alignable with respect to the bolts that hold flanges together without gasket material encircling one or more of the bolts.

It is still a further object of the present invention to provide a gasket that is removably installable in a joint assembly without removal of all bolts holding the assembly together.

It is yet another object of the present invention to provide such a joint assembly that provides for determining the compression of the gasket installed between two opposed flanges.

It is yet a further object of the present invention to provide a gasket that provides for readily manipulating the gasket in the installation thereof.

It is another object of the present invention to provide such a gasket that may be used with more than one size bolt pattern, such as different diameter bolt circles.

The foregoing and other objects, features, and advantages of the invention will be more readily understood upon consideration of the following detailed description of the invention, taken in conjunction with the accompanying drawings.

DETAILED DESCRIPTION OF THE INVENTION

Figure 1:
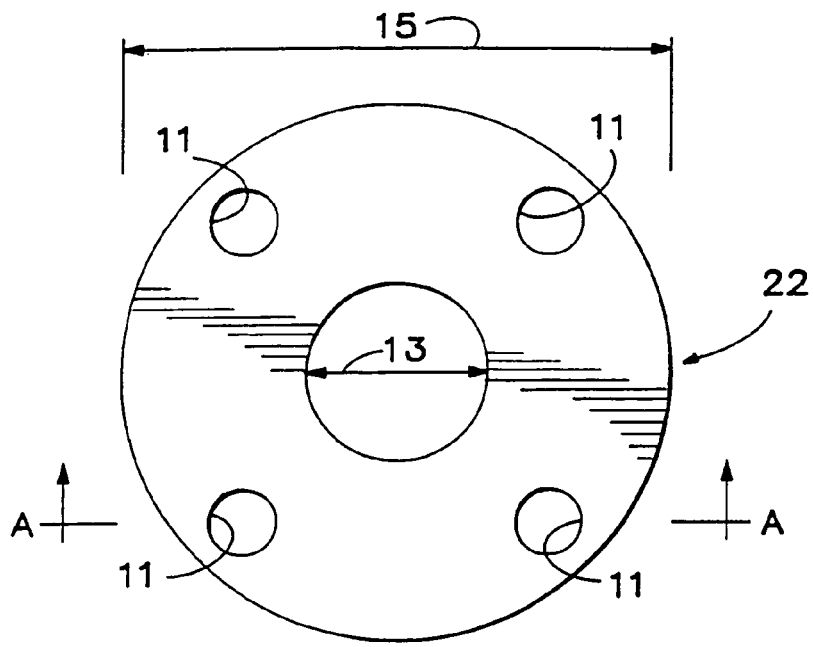
FIG. 1 shows a top view of a conventional flanged pipe joint gasket.

Turning first to FIG. 1, a conventional gasket 22 for a flanged pipe joint assembly typically is annular in shape and has a plurality of apertures 11 for receiving bolts or other fasteners. The inside diameter 13 is substantially equal to the inside diameter of a pipe with which the gasket is to be used, and the outside diameter 15 is substantially equal to the outside diameter of a flange with which the gasket is to be used. Such a gasket may be made of a variety of different materials.

Figure 2:
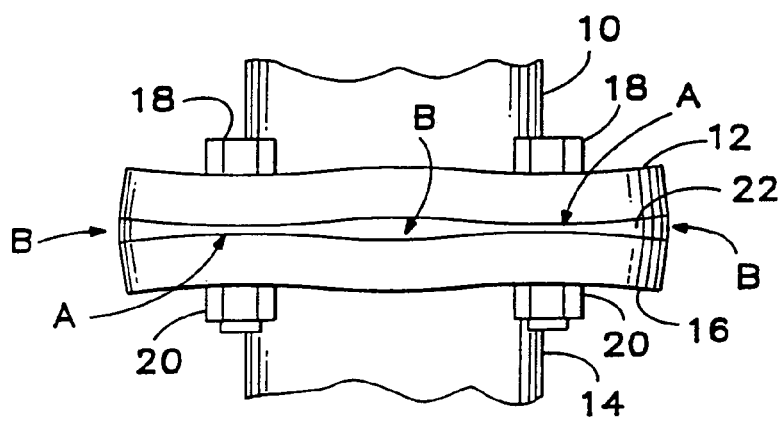
FIG. 2 shows a side view of a flanged pipe joint assembly employing a conventional gasket of the type shown in FIG. 1.

A conventional flanged pipe joint assembly is shown in FIG. 2, wherein a first pipe 10, having a flange 12, is connected to a second pipe 14, having a flange 16, by a plurality of fasteners. The fasteners are typically bolts 18, disposed in circular apertures (not shown) through flanges 12 and 16, and fastened in place by nuts 20, as is commonly understood in the art. A conventional gasket 22, whose apertures 11 correspond to the apertures in the flanges, is disposed between the flanges.

A similar joint assembly is used to connect a flanged pipe to a blind flange, i.e., a flange for closing off the end of a pipe, and to a nozzle, i.e., a flanged outlet from a tank or other container. As used herein, the term "pipe flange", or just "flange", is intended to comprehend blind flanges and nozzle flanges as well as flanges on the end of a pipe or valve.

As can be seen in FIG. 2, when the nuts 20 are tightened onto the bolts 18 so as to forcibly draw the flanges 12 and 16 together, the gasket 22 is compressed in the areas directly beneath the bolts at points A, but resists compression at points B, and thereby causes deformation of the flanges. This is particularly so where the rigidity of the pipe flange is similar to the compressibility of the gasket material, as in the use of PVC, CPVC, FRP, PVDF, PP, and other nonmetallic pipe.

Figure 3:
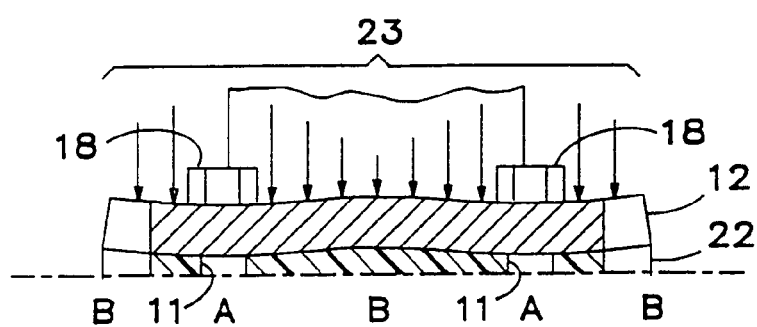
FIG. 3 shows a force diagram for a flanged pipe joint assembly employing a conventional gasket, the force being shown along a line passing through two adjacent bolts of the assembly as shown with respect to a conventional gasket by line A—A in FIG. 1.

This can be seen more clearly in FIG. 3 where one flange 12, made of FRP, and one-half of the conventional gasket 22 is illustrated in a force diagram. The bolts 18 are located at positions A, and the flange is most deformed at positions B. The arrows 23 show a typical distribution of force exerted by the flange 12 on the conventional gasket 22 in a state of equilibrium along a line passing through due to the distribution of forces on the flange 12, shown by the arrows 23, the flange undergoes a bending moment, which can cause the flange to distort and eventually break. Indeed, the flange is substantially distorted at points B.

Figure 4:
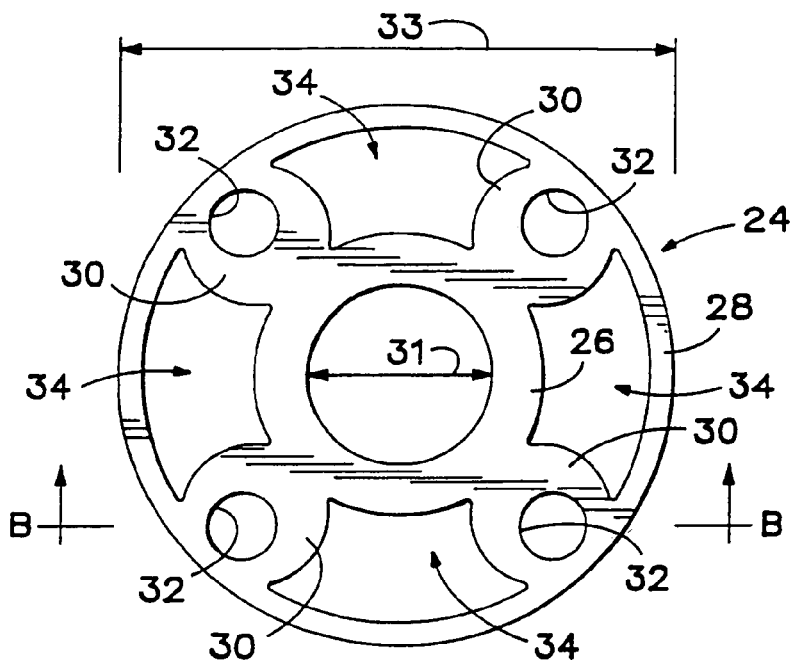
FIG. 4 shows a top view of a gasket according to the present invention.

Turning to FIG. 4, a joint assembly according to the present invention has a gasket 24 that comprises an inner ring 26, an outer ring 28 and a plurality of spokes 30 extending between the inner ring and the outer ring. The inner ring comprises a strip of material formed in a substantially-continuous, annular loop whose outer periphery is greater in diameter than the inner diameter of the flanges. That is, it must be greater than the inner diameter of the pipes or the nozzle and pipe connected thereto, or the pipe to which a blind flange or valve is connected. The outer ring comprises a strip of material formed in a substantially-continuous, annular loop whose inner periphery is greater in diameter than the outer periphery of the inner ring but less than the diameter of the outer periphery of the flanges. Ordinarily, the inside diameter 31 of the inner ring 26 is substantially equal to the inside diameter of a pipe with which the gasket is to be used, and the outside diameter 33 of the outer ring 28 is substantially equal to the diameter of the outer periphery of the flanges.

The spokes have apertures 32 therein for receiving bolts, and the spaces 34 between the inner ring, outer ring and spokes preferably are void. For example, about 40 percent of the area between the two flanges may be separated by voids in the gasket. However, it is to be recognized that, rather than making that area entirely void, gasket material significantly thinner than that which forms the inner ring, outer ring and spokes could be used without departing from the principles of the present invention. It is also to be recognized that more than two concentric rings may be used without departing from the principles of the invention.

The gasket may be made of a substantially flat, relatively chemically inert, compressible, and resilient material such as the synthetic polymer marketed under the trademark TEFLON by E.I. DuPont De Nemours and Company. Preferably, it is made of the product marketed by W. L. Gore & Associates under the trademark GORE-TEX GR SHEET. However, it is to be recognized that other gasket material may be used without departing from the principles of the invention.

There are some important characteristics of preferred gasket or sealing material. One such characteristic is that the gasket material has a hardness less than at least one flange so that the gasket material compresses when the flanges are drawn together and expands to maintain a seal when the space between the flanges increases. Preferably, the gasket material should have a durometer less than 95, as measured by a durometer having a Shore A scale ranging from zero to one hundred. It has been found that material having a durometer of about 55–70 works particularly well with PVC, CPVC, FRP, PVDF, PP and other nonmetallic pipe flanges. Another desirable characteristic of the material is that it has the property of compressing in the direction of applied compressive force without substantial expansion lateral thereto.

Figure 5:
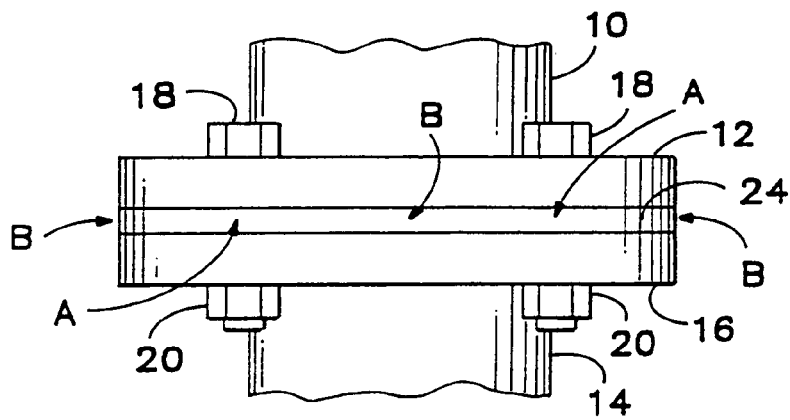
FIG. 5 shows a side view of a flanged pipe joint assembly employing a gasket according to the present invention.

When the gasket 24 is placed in a joint assembly, as shown in FIG. 5, those portions of the flanges 12 and 16 which are disposed adjacent the void spaces 34 do not experience any resistance to movement in the direction of one another and do not experience significant bending moments. Rather, the gasket as a whole generally becomes evenly compressed and the flanges 12 and 16 are not distorted.

Figure 6:
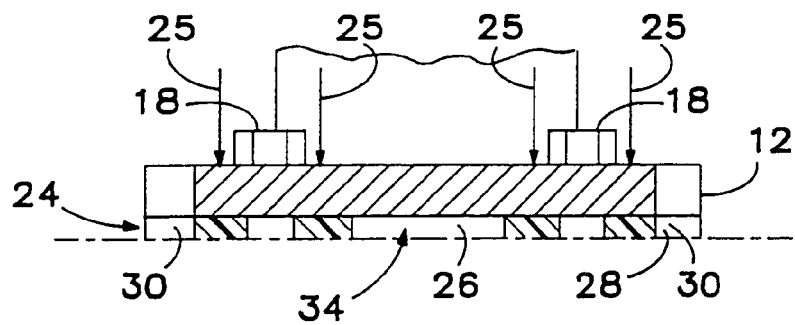
FIG. 6 shows a force diagram for a flanged pipe joint assembly employing a gasket according to the present invention, the force being shown along a line passing through two adjacent bolts of the assembly as shown with respect to a gasket according to the present invention by line B—B in FIG. 4.

Thence, the force diagram for the pipe joint assembly employing a gasket according to the present invention is shown in FIG. 6. Only one flange, made of FRP, and one-half of the gasket 24 are shown. The arrows 25 illustrate the distribution of force exerted by the flange 12 on the gasket 24 of the invention in a state of equilibrium along a line passing through two adjacent bolts of the assembly. As can be seen, there is no significant distortion of the flanges at points B.

In reality, even with the gasket 24, there is likely to be some distortion of the flanges at the periphery thereof. In applications using gasket 24, this is due to the presence of the outer ring 28. However, there should be very little distortion in comparison to the use of the conventional gasket shown in FIG. 1. Since the inner ring of gasket 24 is located adjacent the openings of pipes 10 and 14, there will be virtually no distortion in that area, as a practical matter. In any event, the bending moments and distortion of the flanges is greatly reduced relative to use of conventional gaskets, and the reliability of the joint assembly is thereby greatly enhanced by the use of the gasket according to the present invention.

Figure 7:
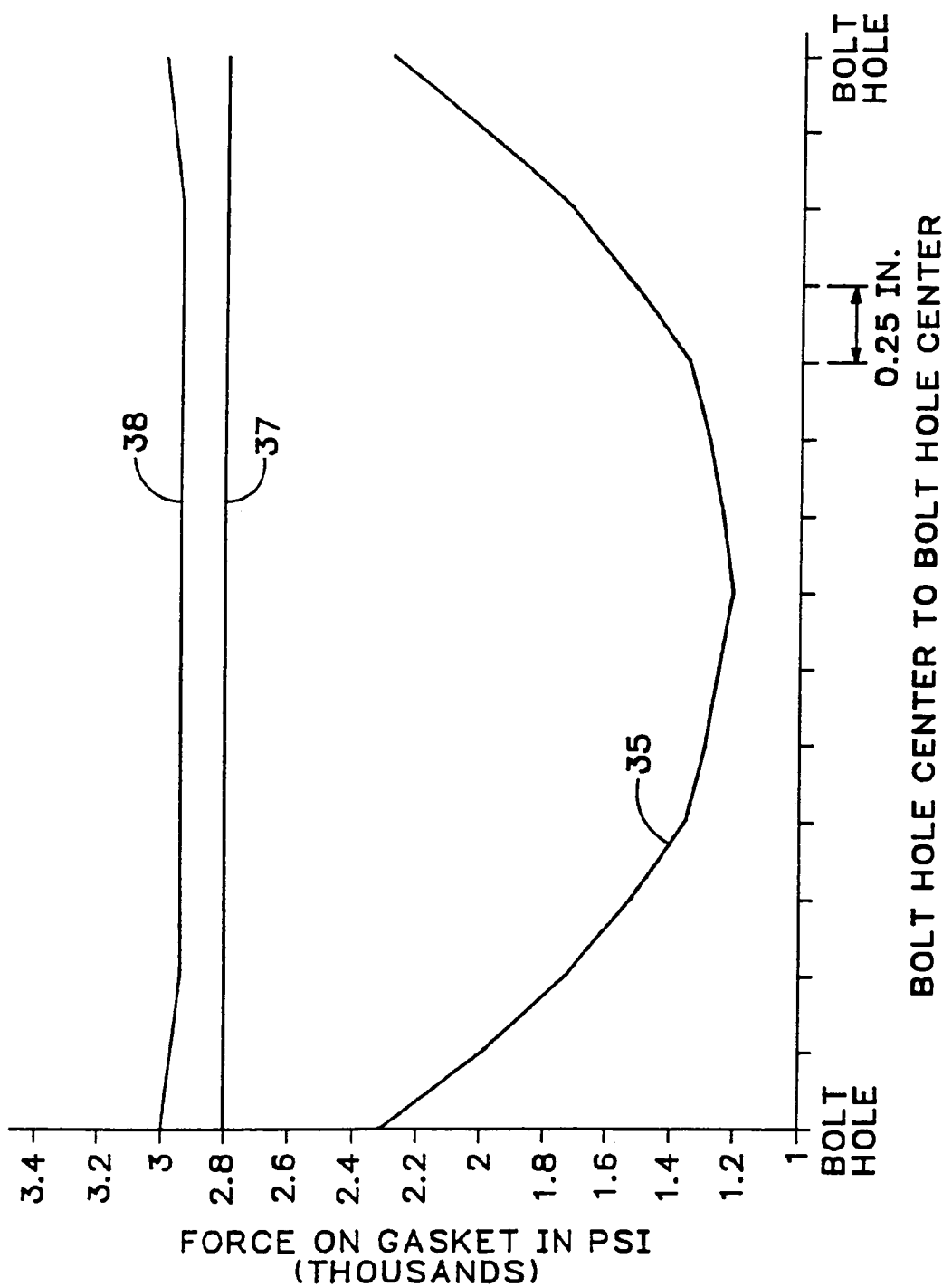
FIG. 7 is a graph of pressure on a conventional gasket, the pressure required to seal a gasket made of a preferred gasket material, and pressure on a gasket according to the present invention, as a function of position between two adjacent bolts.

An advantage of a gasket according to the present invention is that a greater amount of pressure can be applied by the fastening bolts than with the use of a conventional gasket. FIG. 7 shows, at line 35, a graph of the maximum pressure that can ordinarily be applied with a conventional gasket made of GORE-TEX GR SHEET material, as a function of position between two adjacent bolts, the marks along the horizontal axis representing 0.25 inch increments of distance for a 6 inch diameter flange. It can be seen that, while a maximum pressure of about 2300 psi may be applied at the bolts, that results in only about 1300–1500 psi over most of the distance between the bolts.

Line 37 shows the minimum pressure that must be applied to guarantee a seal using GORE-TEX GR SHEET material. This material is highly desirable to use because of its chemically inert property. Yet, that amount of pressure cannot be applied to a gasket of conventional design without damaging the flanges because of the non-uniform distribution of pressure and resulting distortion of the flanges.

Line 38 shows a graph of pressure applied with a gasket according to the present invention. GORE-TEX GR SHEET material allows a pressure in excess of 3000 psi at the bolts, and the gasket of the present invention distributes the pressure more evenly over the portions of the flanges between the bolts and over the rings. In the example shown, the minimum pressure between the bolts is about 2945 psi. As a result, a much more effective seal can be achieved by the gasket of the present invention. In particular, due to the minimal distortion of the flanges, sufficient pressure can be applied to guarantee a seal initially.

In addition, an important feature of the multi-ring gasket of the present invention is that if the inner ring ruptures, the outer ring still prevents hazardous material from escaping until the gasket can be replaced.

Figure 8:
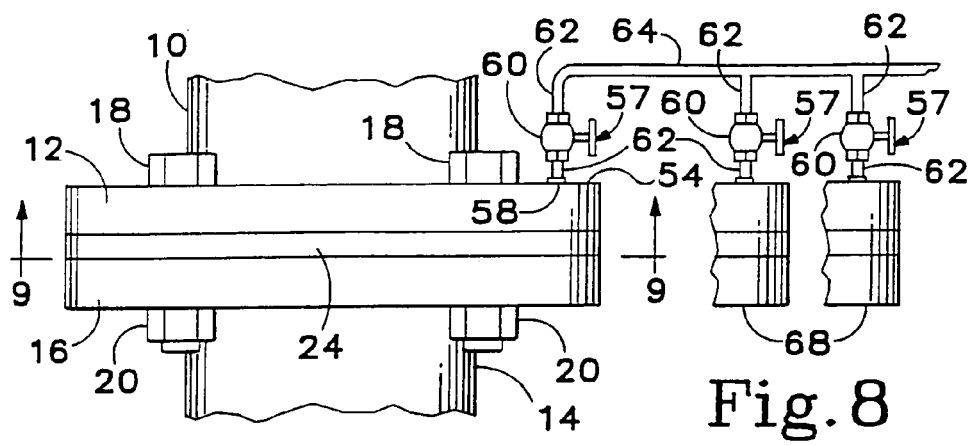
FIG. 8 shows a side view of an alternative embodiment of a flanged pipe joint assembly according to the present invention, having a valve assembly attached thereto.
Figure 9:
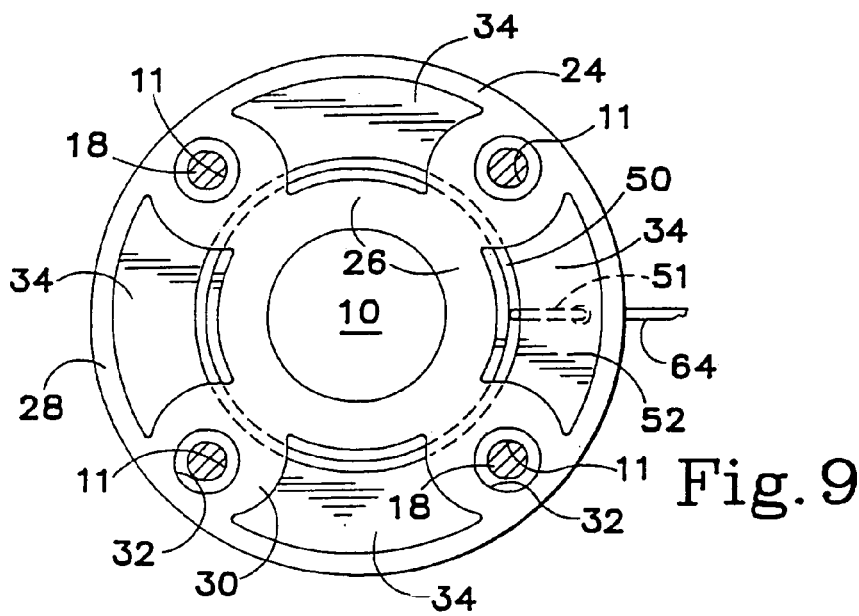
FIG. 9 shows a top sectional view of the flanged pipe joint assembly of FIG. 8, taken along line 9—9 thereof.
Figure 10:
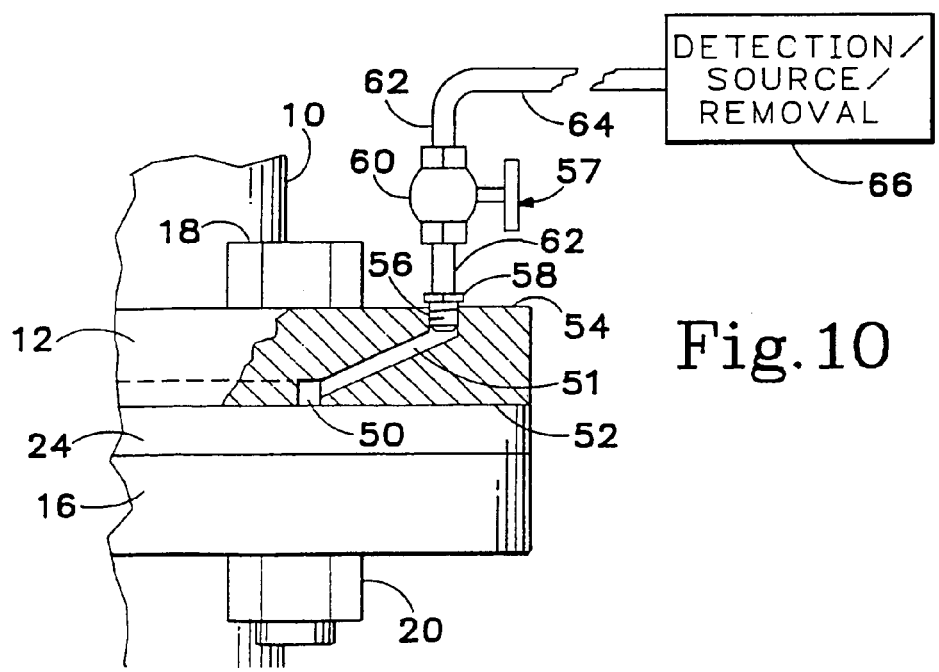
FIG. 10 shows an enlarged side view of a portion of the flanged pipe joint assembly of FIG. 8, in partial section.

Turning to FIGS. 8, 9 and 10, an alternative embodiment of a joint assembly according to the present invention includes a groove 50 and a channel 51 formed in at least one flange 12 or 16. The groove 50 is disposed in an inside surface 52 of the respective flange 12 or 16 adjacent the gasket 24, between the outer periphery of the gasket's inner ring 26 and the inner periphery of the gasket's outer ring 28. As shown in FIG. 9, the groove 50 preferably is disposed so as to be in communication with the gasket's spaces 34 but not with either the apertures 11 through the flanges 12 and 16, the fasteners inserted therein or the apertures 32 of the gasket's spokes 30. The groove 52 preferably is annular, although other shapes may be used without departing from the principles of the invention.

The channel 51 is disposed through the respective flange 12 or 16 and is in communication, at the first end thereof, with the groove 50 and, at the second end thereof, with an outside surface 54 of the flange. The channel 51 has a port 56 disposed at the second end thereof. The port 56 has shape and dimensions selected so as to connect a tapping mechanism 57 thereto, the tapping mechanism 57 providing for selective transmission of fluids or other materials into or out of the channel 51 and groove 50, or for detection of fluids or materials therein, or both. Preferably, the port 56 comprises a cylindrical aperture of predetermined diameter and depth so that the tapping mechanism 57 may be connected by a fitting 58 inserted in the port 56. As shown, the fitting 58 is threaded so as to self-tap into the port 56, forming a seal that substantially prevents release of fluids or other materials into the environment. It is to be recognized, however, that the tapping mechanism 57 may be connected using means other than a self-tapping fitting, without departing from the principles of the invention.

The mechanism 57, in one embodiment, comprises a valve 60 and tubing 62. The valve 60 is connected to the fitting 58 and to a main tube 64 by tubing 62. The valve 60 may be adjusted to transmit fluids and other materials selectively into or out of the channel 51 and the groove 50 through the tubing 62 and the main tube 64. The main tube 64 preferably is connected to a device 66 that detects, sources, or removes fluids or other materials in the groove 50 and channel 51, or performs some combination thereof, operating in combination with the tapping mechanism 57. Although, as shown, the tapping mechanism 57 and the device 66 are separate, it is to be recognized that they may be a single unit without departing from the principles of the invention. It is preferred, however, to have the device 66 separate so as to connect thereto, by one or more main tubes 64, a plurality of joint assemblies 68, each having a respective tapping mechanism 57, as shown in FIG. 8. It is also preferred that each tapping mechanism 57 and the device 66 are individually controlled from a central location so that each joint assembly 68 can be monitored for fugitive emissions individually and substantially continuously. In this manner, the device 66 may selectively (i) source fluids or other materials, such as inert gas, to pressurize the gasket 24, either to prevent fugitive emissions from entering the gasket or to drive any emissions present back into the pipe 10, (ii) provide a pressure gradient so as to remove fluids or other materials, including fugitive emissions, from the gasket 24 through the tapping mechanism 57, tubing 62 and main tube 64, (iii) detect fugitive emissions, for example by detecting the pressure or changes in pressure within the joint assembly, (iv) detect the pressure of the fluids or other materials introduced into the joint assembly, or (v) combinations of the above.

A number of additional embodiments of the present invention are shown in FIGS. 11 through 29. These embodiments introduce several further features, including: a three ring gasket for use with more than one size of flange; a gasket having a substantially inset outermost ring for use with a flange whose mating surface is interior of the bolts that hold two flanges together; a gasket having open alignment spokes that do not encircle the bolts that hold two flanges together; a gasket having an outer periphery that is at least partially rectilinear; a gasket having one or more peripheral notches for receiving a thickness gauge to measure the spacing between two opposed flanges so as to determine the compression of the installed gasket; a gasket having shelves adjacent the alignment spokes to align the gasket with more than one size flange; a gasket having a tab for manipulating the gasket in the installation thereof; and a gasket having one or more closed alignment spokes that include apertures for receiving bolts, the apertures being radially elongate so as to accommodate different size bolt patterns, such as different diameter bolt circles.

Figure 11:
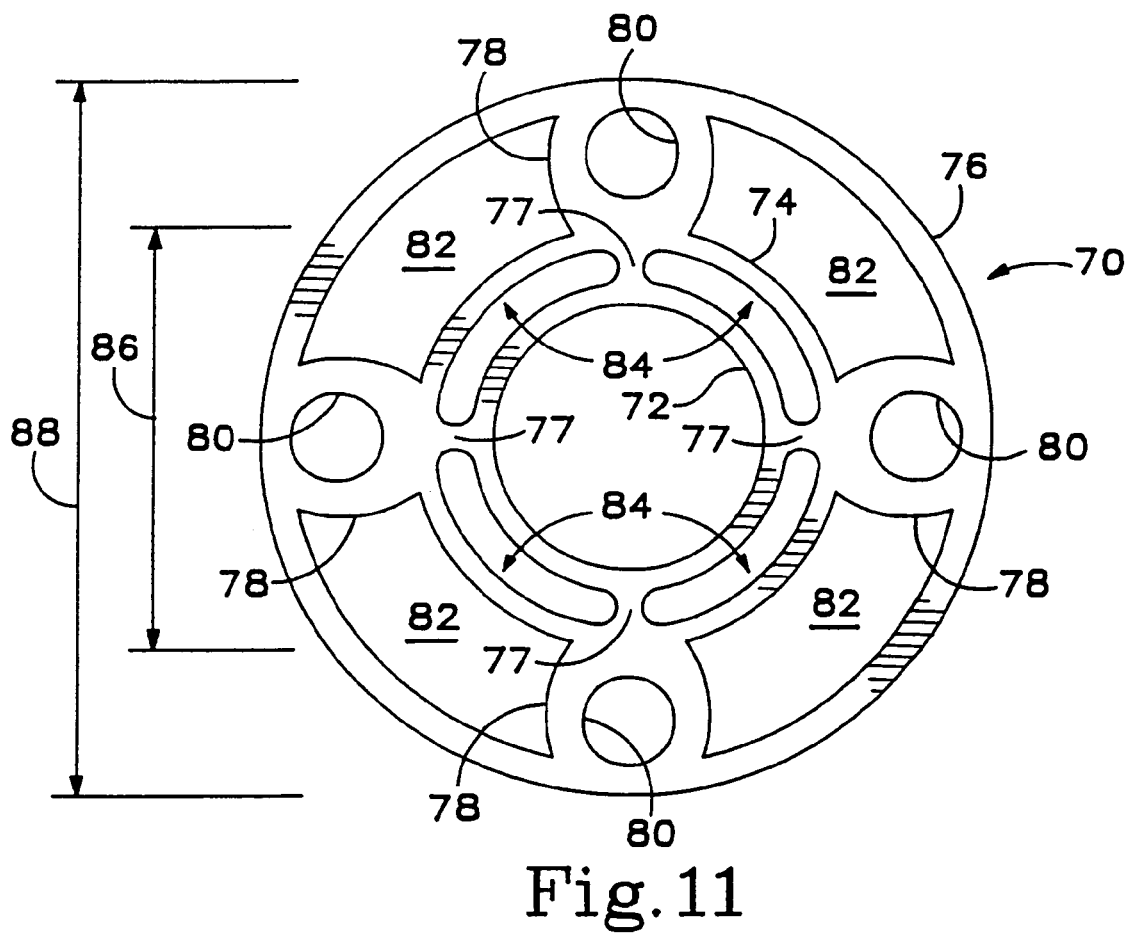
FIG. 11 shows a top view of a second embodiment of a gasket having three rings according to the present invention.

Referring to FIG. 11, a gasket 70 for use with more than one size of flange comprises an inner ring 72, a first outer ring 74, a second outer ring 76, a plurality of inner spokes 77 extending between the inner ring 72 and the first outer ring 74 and a plurality of spokes 78 extending between the first outer ring 74 and the second outer ring 76. The alignment spokes 78 have apertures 80 therein for receiving bolts. The spaces 82 between the first outer ring 74, the second outer ring 76, and the alignment spokes 78 are void. The spaces 84 between the first outer ring 74, the inner ring 72, and the inner spokes 77 are also void. The outside diameter 86 of the first outer ring 74 is substantially equal to the diameter of the outer periphery of a first selected flange. The outside diameter 88 of the second outer ring 76 is substantially equal to the diameter of the outer periphery of a second selected flange. Thence, the gasket 70 can be used with the first flange or the second flange.

Figure 12:
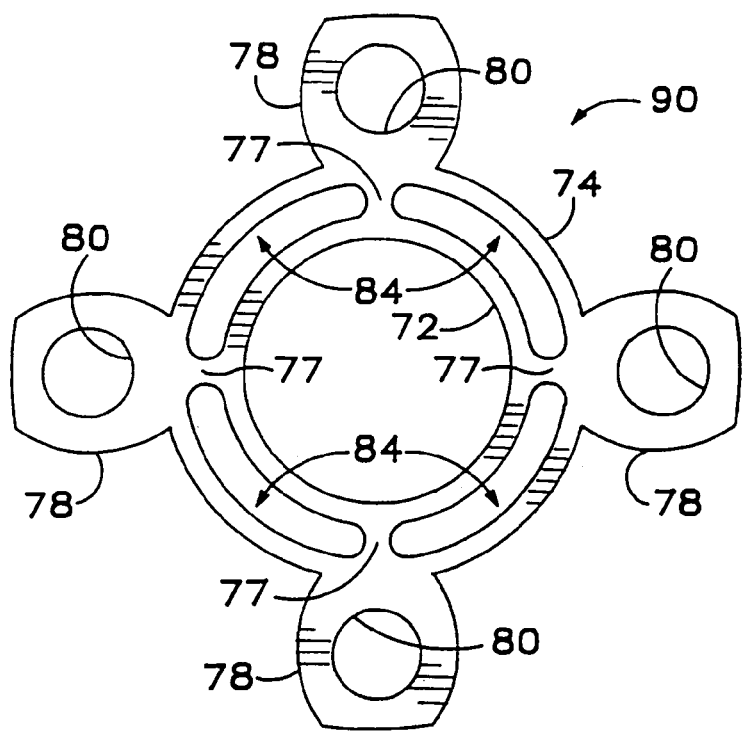
FIG. 12 shows a top view of a third embodiment of a gasket having an inset outer ring according to the present invention.

FIG. 12 shows a third gasket embodiment 90. It is substantially similar to the embodiment of FIG. 11, except that it has no second outer ring and, thereby, has an outermost ring that, in use, is substantially inset from the bolts surrounding the gasket.

Figure 13:
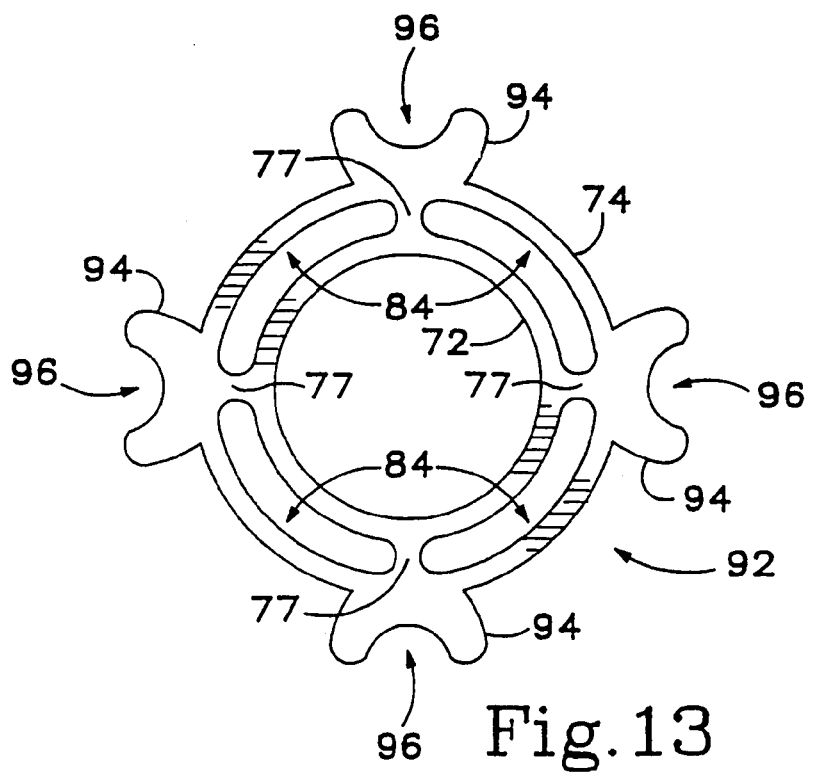
FIG. 13 shows a top view of a fourth embodiment of a gasket having an inset outer ring and open alignment spokes according to the present invention.

FIG. 13 shows a fourth gasket embodiment 92. It is substantially similar to the third gasket embodiment 90, except that it has open alignment spokes 94, thereby providing alignment concavities 96 which, in use, are placed adjacent, including resting against, the bolts surrounding the gasket. Open alignment spokes 94 also generally provide for removably installing the gasket 92 in a joint assembly without removal of all such bolts; for this gasket embodiment 92 only as many as half the bolts need to be removed in an installation.

Figure 14:
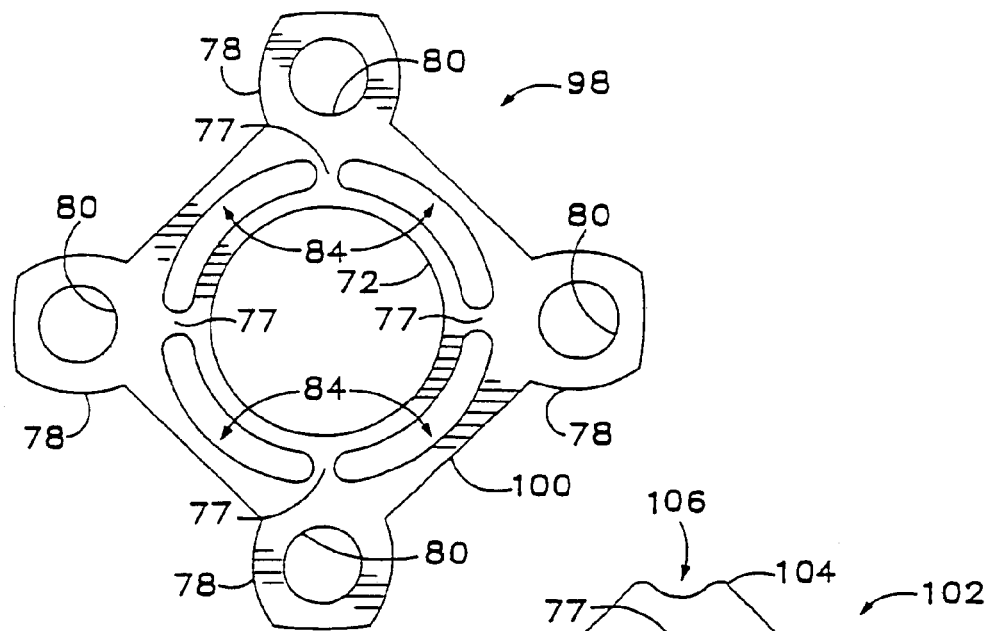
FIG. 14 shows a top view of a fifth embodiment of a gasket having a partially rectilinear periphery according to the present invention.

A fifth gasket embodiment 98 is shown in FIG. 14. Gasket 98 is substantially similar to gasket 90 in FIG. 12, except that gasket 98 has an outer ring 100 whose periphery is partially rectilinear. More particularly, gasket 98 has a square periphery except for the alignment spokes 78, though it is to be recognized that other rectilinear shapes, or substantial polygons, could be used.

Figure 15:
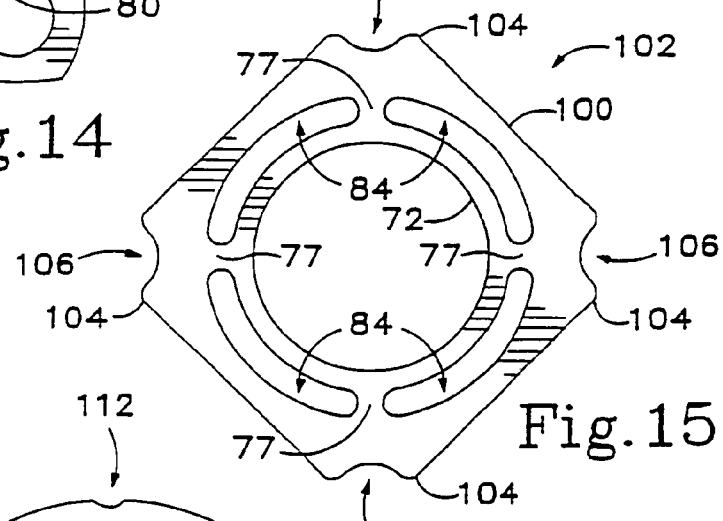
FIG. 15 shows a top view of a sixth embodiment of a gasket having a partially rectilinear periphery and open alignment spokes according to the present invention.

A sixth gasket embodiment 102, shown in FIG. 15, is substantially similar to the gasket 98 shown in FIG. 14, except that it has open alignment spokes 104, which define respective open alignment concavities 106.

Figure 16:
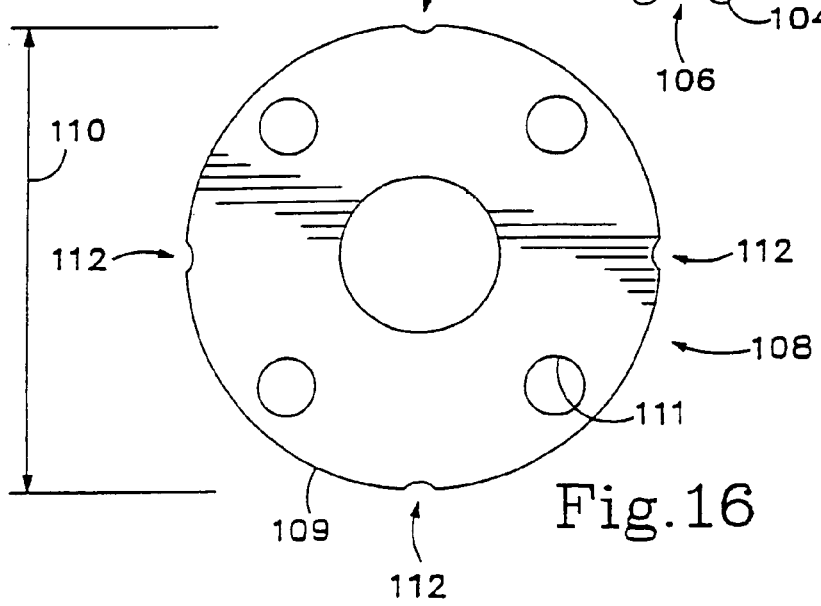
FIG. 16 shows a top view of a seventh embodiment of a gasket having a single ring with peripheral thickness gauge notches therein according to the present invention.

FIG. 16 shows a seventh gasket embodiment 108. Gasket 108 has a single ring 109 and apertures 111 disposed therein for receiving bolts. Gasket 108 has an outside diameter 110 which is substantially equal to the diameter of the outer periphery of a selected flange. Gasket 108 also has a plurality of notches 112 in its outer periphery for receiving thickness gauges when the gasket is installed between two flanges. By inserting thickness gauges into the notches 112, the spacing between the two flanges can be determined, which is a measure of the amount of compression of the gasket 108. This is an important measurement for installing the gasket with an appropriate amount of compression, for testing the adequacy of the joint periodically and for ensuring that the flange mating surfaces are properly aligned. While the notches 112, as shown, are substantially concave, it is to be recognized that the notches may have other shapes without departing from the principles of the invention.

Figure 17:
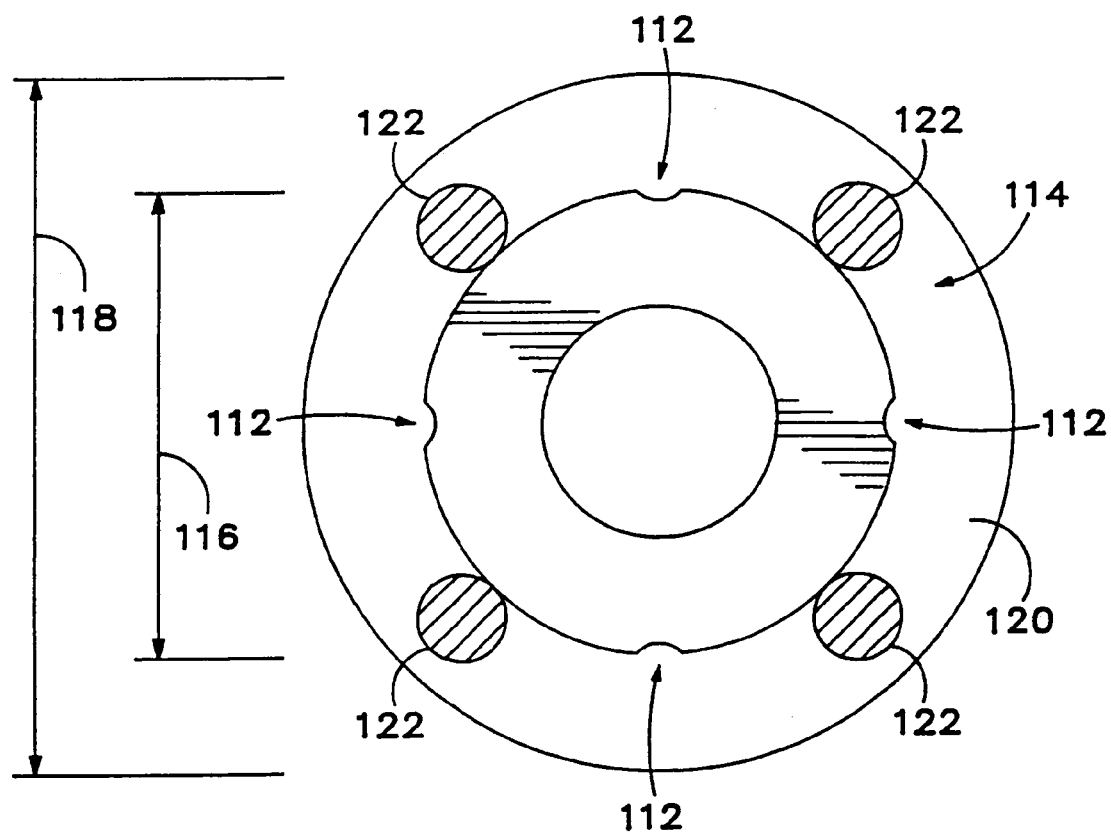
FIG. 17 shows a top view of an eighth embodiment of a gasket having a single ring with peripheral thickness gauge notches therein according to the present invention.

An eighth gasket embodiment 114, shown in FIG. 17, is substantially similar to the gasket 108 in FIG. 16, except that the outside diameter 116 of gasket 114 is less than the diameter 118 of the outer periphery of a selected flange 120. As shown, the gasket 114, when installed, fits within the pattern formed by the bolts 122 which hold two such flanges together and, accordingly, has no apertures for receiving bolts.

Figure 18:
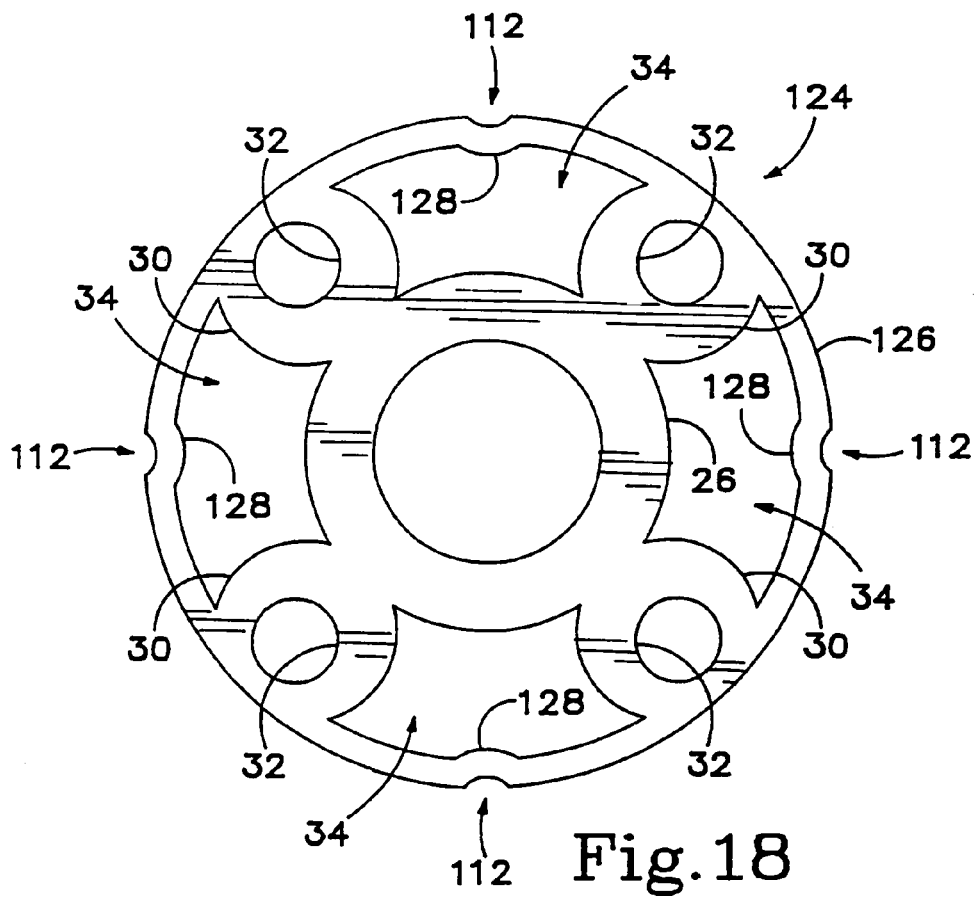
FIG. 18 shows a top view of a ninth embodiment of a gasket having thickness gauge notches in the outside of an outer ring and corresponding convexities on the inside of the outer ring according to the present invention.

A ninth-gasket embodiment 124 is shown in FIG. 18. Gasket 124 is substantially similar to gasket 24 in FIG. 4, except that the outer ring 126 of gasket 124 has notches 112 in the outside thereof and corresponding convexities 128 on the inside thereof. The notches 112, as previously described, are for receiving thickness gauges. The convexities 128 maintain the strength of the outer ring 126 at the locations of the notches 112.

Figure 19:
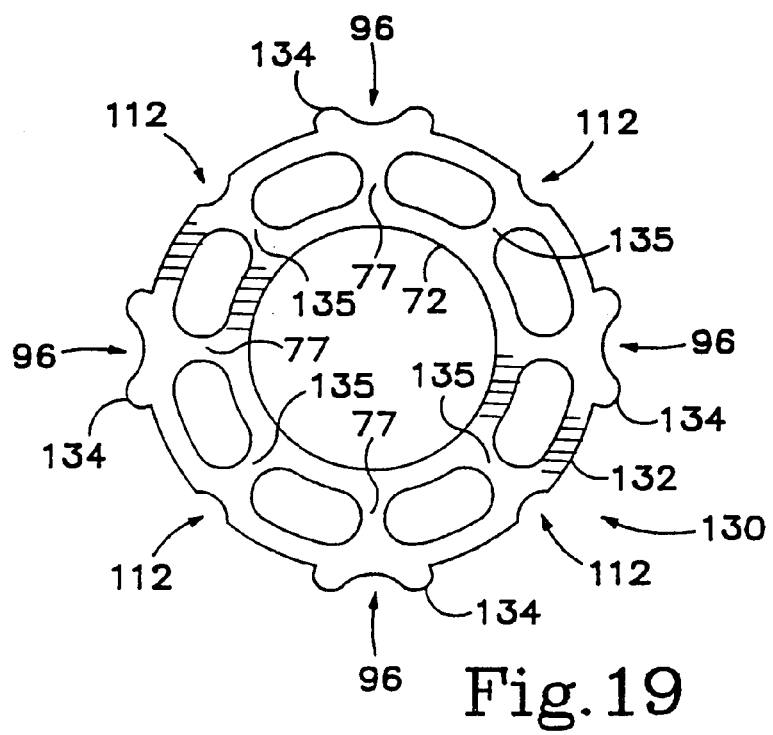
FIG. 19 shows a top view of a tenth embodiment of a gasket having an inset outer ring, open alignment spokes, thickness gauge notches and reinforcement spokes between an inner ring and the outer ring at the location of the thickness gauge notches according to the present invention.

The tenth gasket embodiment 130, shown in FIG. 19, is substantially similar to the gasket 92 in FIG. 13 in that it has an inset outer ring 132, inner ring 72, inner spokes 77 and open alignment spokes 134 defining alignment concavities 96, while also being similar to the gasket 124 in FIG. 18 in that it has notches 112 in the outside of its outermost ring, ring 132. In addition to the open alignment spokes 134 and inner spokes 77, gasket 130 also has reinforcement spokes 135 disposed at the locations of the notches 112 so as to extend between the inner ring 72 and the outer ring 132, thereby maintaining the strength of the gasket at the notches 112. While the open alignment spokes 134 as shown are somewhat shorter than the open alignment spokes 94 shown in FIG. 13, for instance to accommodate a larger diameter flange, it is to be recognized that the open alignment spokes 134 may be of any length suitable for the installation.

Figure 20:
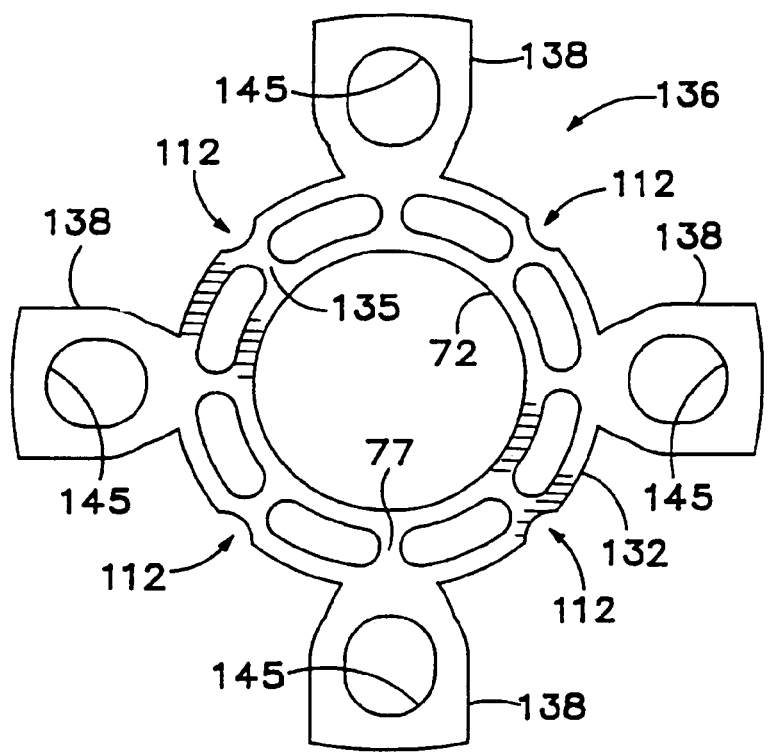
FIG. 20 shows a top view of an eleventh embodiment of a gasket having an inset outer ring, closed alignment spokes, peripheral thickness gauge notches and reinforcement spokes between an inner ring and the outer ring at the location of the thickness gauge notches according to the present invention.

FIG. 20 shows an eleventh gasket embodiment 136, which is substantially similar to the gasket 130 shown in FIG. 19, except that it has closed alignment spokes 138 having apertures 145 therein for receiving bolts. The apertures 145 preferably are radially elongate so as to accommodate bolts having various dispositions relative to the flanges, i.e., having different size bolt patterns, such as different diameter bolt circles.

Figure 21:
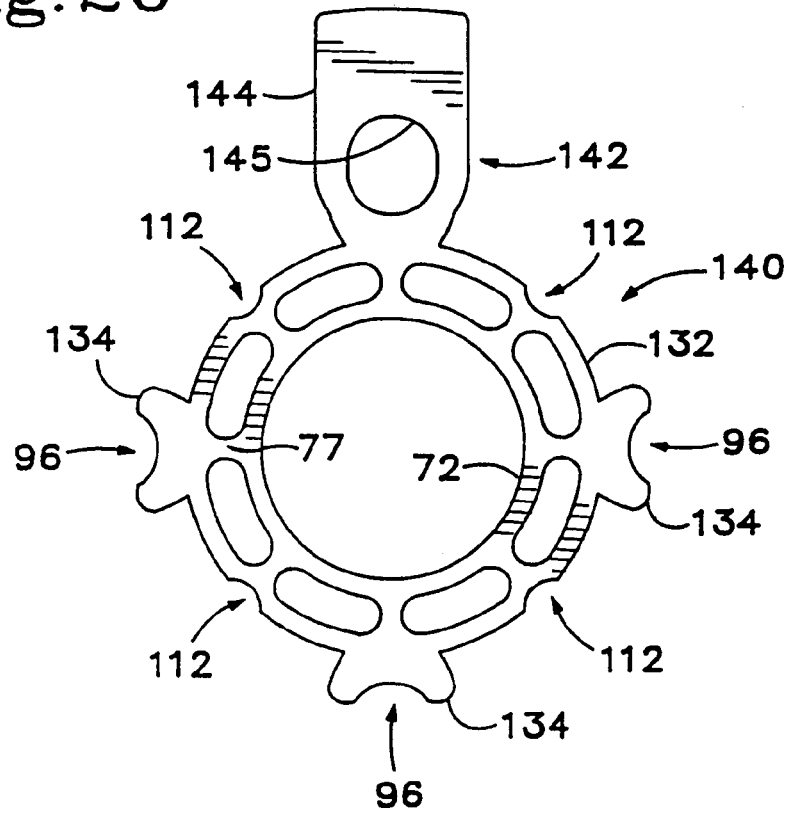
FIG. 21 shows a top view of a twelfth embodiment of a gasket having an inset outer ring, open alignment spokes, one combined closed alignment spoke and tab, thickness gauge notches and reinforcement spokes between an inner ring and the outer ring at the location of the thickness gauge notches according to the present invention.

FIG. 21 shows a twelfth gasket embodiment 140, which is substantially similar to the gasket 130 shown in FIG. 19, except that it has open alignment spokes 134 and one combined closed alignment spoke 142 and tab 144. The tab 144 preferably extends well beyond the bolts so that it can be used to manipulate, position and align the gasket 140 during installation. Spoke 142 has an aperture 145 which, as previously described, preferably is radially elongate.

Figure 22:
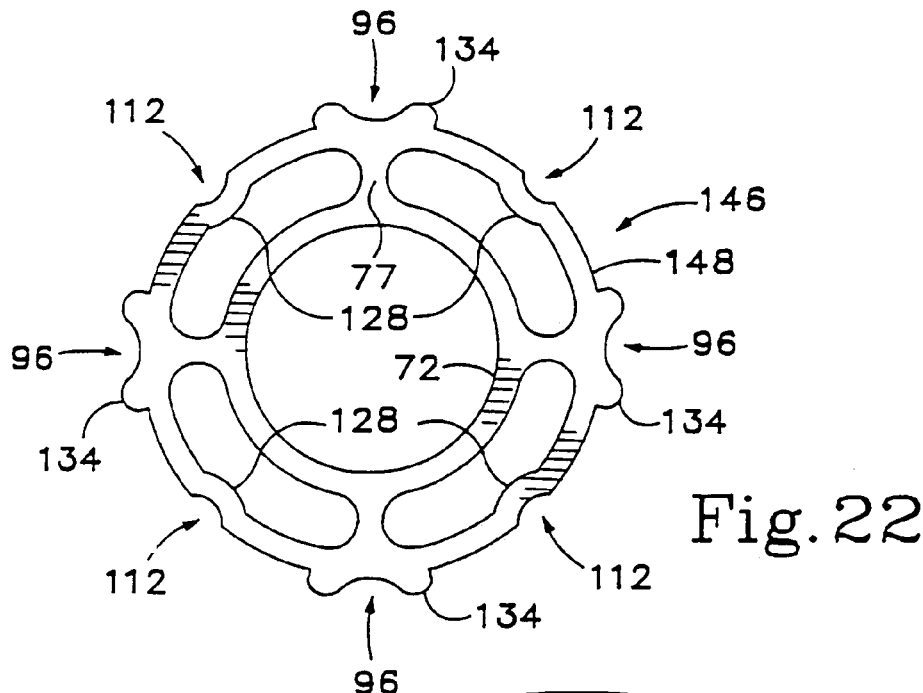
FIG. 22 shows a top view of a thirteenth embodiment of a gasket having an inset outer ring, open alignment spokes, thickness gauge notches in the outside of the outer ring and corresponding convexities on the inside of the outer ring according to the present invention.

The thirteenth gasket embodiment 146 shown in FIG. 22 is substantially similar to the gaskets 92 and 124 shown in FIGS. 13 and 18, respectively, in that it has an inset outer ring 148 with notches 112 in the outside thereof and corresponding convexities 128 on the inside thereof, and has open alignment spokes 134.

Figure 23:
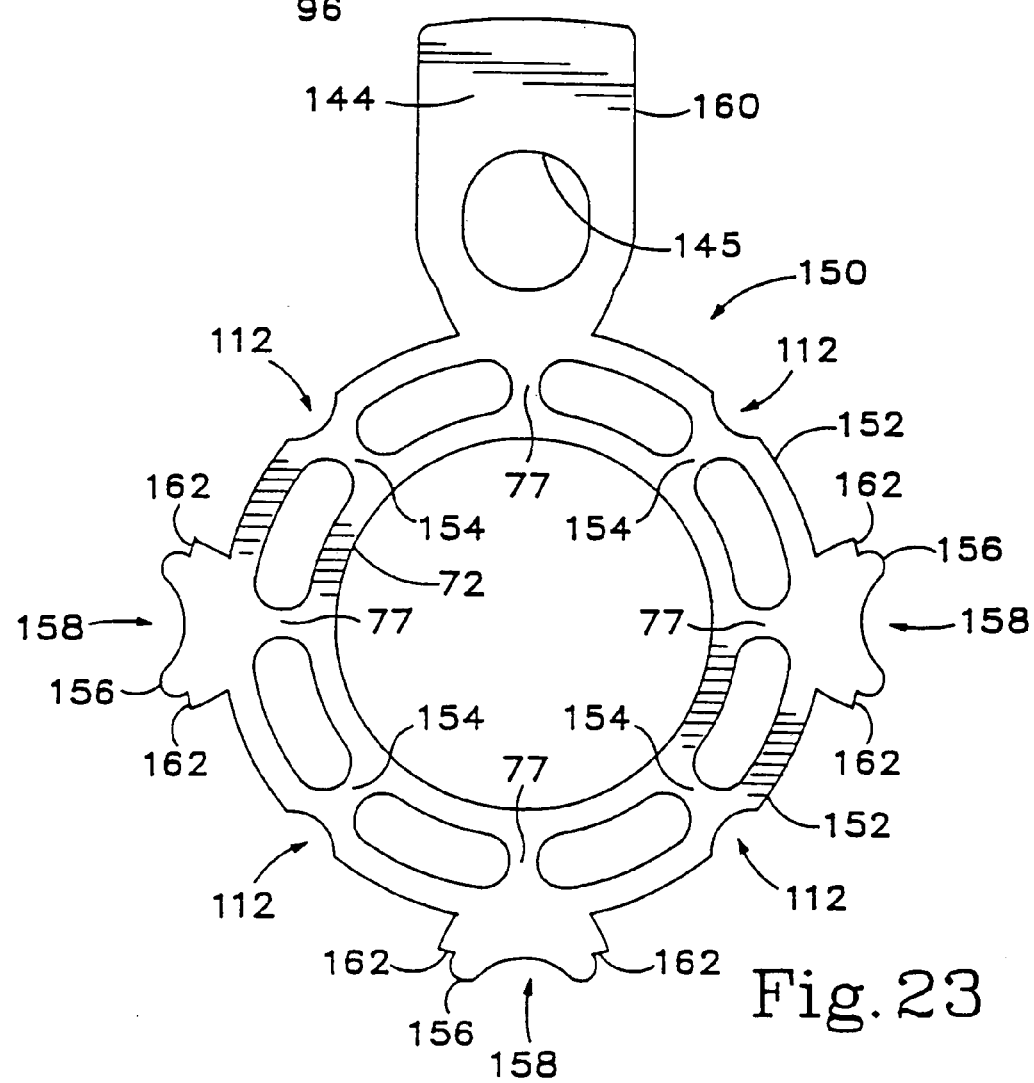
FIG. 23 shows a top view of a fourteenth embodiment of a gasket having an inset outer ring, open alignment spokes, a combined closed alignment spoke and tab, alignment shelves on the open alignment spokes, thickness gauge notches in the outside of the outer ring and reinforcement spokes between an inner ring and the outer ring at the location of the thickness gauge notches according to the present invention.

The fourteenth gasket embodiment 150 shown in FIG. 23 is a two ring gasket which combines the features of an inset outer ring 152, an inner ring 72, inner spokes 77, notches 112 in the outside of the outer ring 152, reinforcement spokes 154 disposed between the inner ring 72 and the outer ring 152 at the locations of the notches 112, open alignment spokes 156 defining alignment concavities 158, and one combined closed alignment spoke 160 and tab 144. The closed alignment spoke 160 has an aperture 145 which, as previously described, preferably is radially elongate. The gasket 150 also has pairs of centering shelves 162, each associated with a respective alignment spoke 156 or 160.

Figure 24:
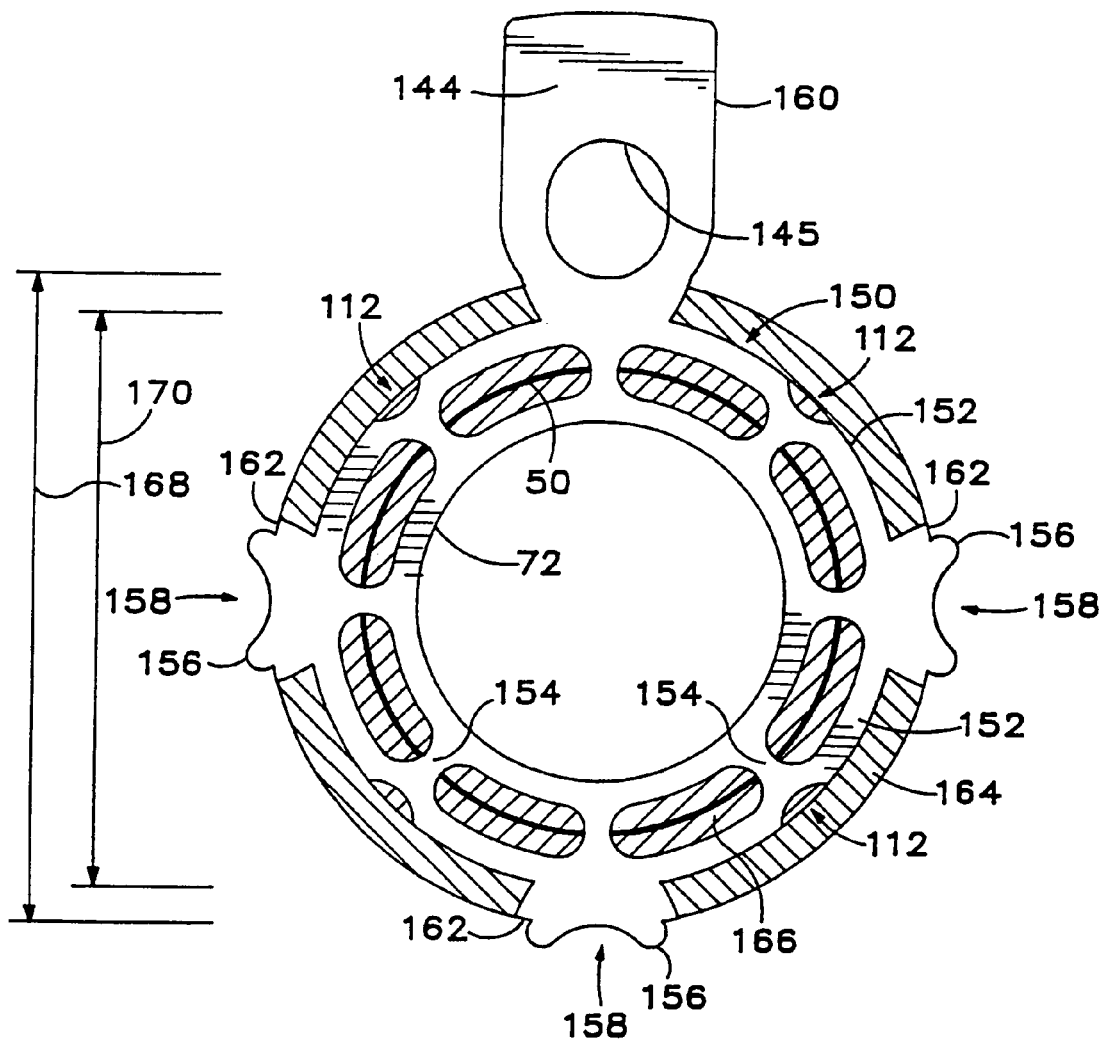
FIG. 24 shows a top view of the embodiment of the gasket of FIG. 23 superimposed on two different size flanges.

In FIG. 24, gasket 150 is shown superimposed on two different, concentrically illustrated flanges, 164 and 166, having outer diameters 168 and 170, respectively. The outside diameter of the outer ring 152 of gasket 150 is substantially equal to the diameter 170 of the flange 166. The diameter of a circle defined by the shelves 162 is substantially equal to the diameter 168 of the flange 164. Consequently, gasket 150 can be centered to either size flange, either by the outside of the gasket's outer ring 152 or by the centering shelves 162, depending on which size flange is being used. Flange 166 also includes a groove 50, which has pressure equal to that within the voids between ring 72 and ring 152.

Figure 25:
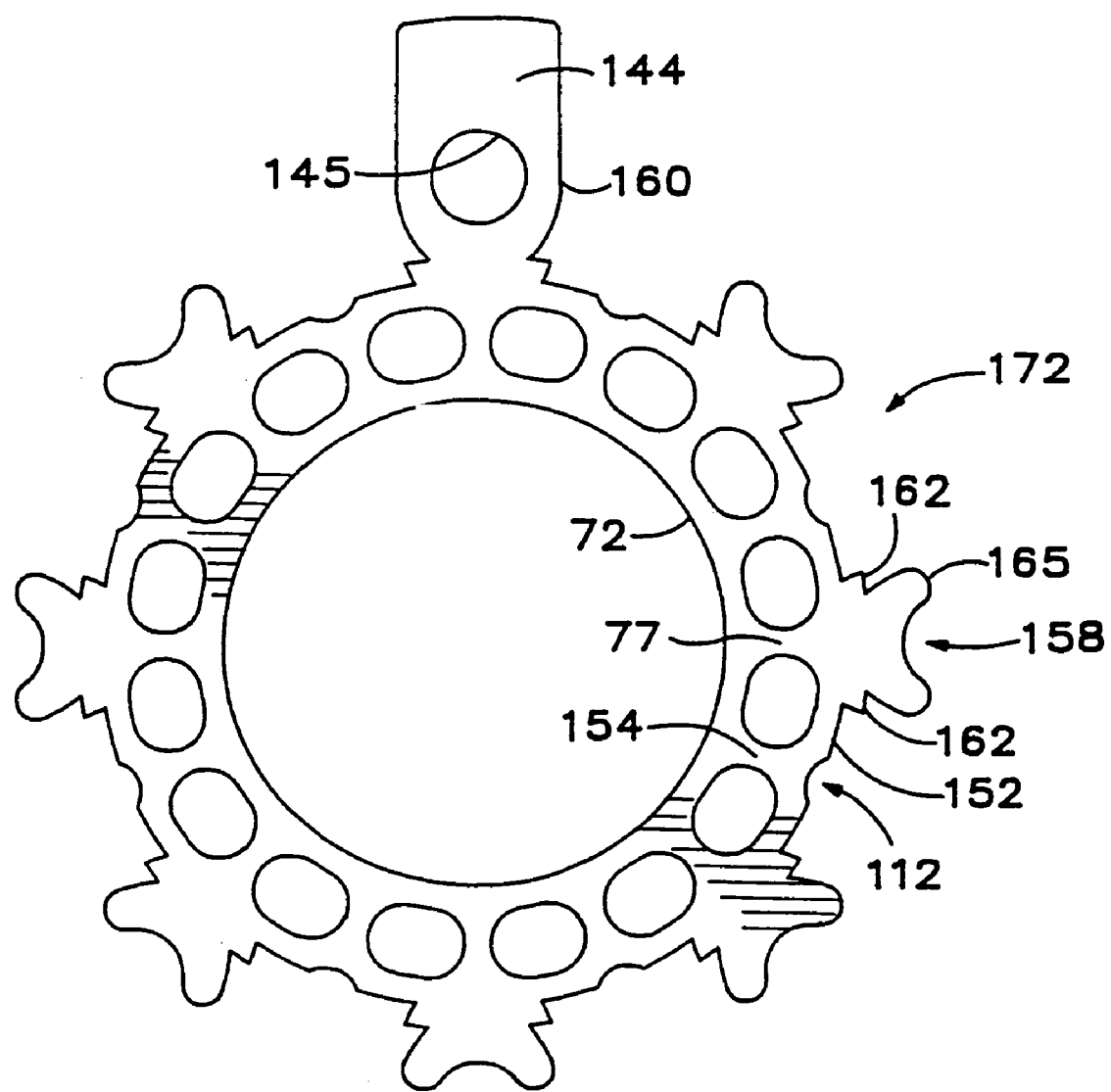
FIG. 25 shows a top view of a fifteenth embodiment of a gasket having an inset outer ring, open alignment spokes, a combined closed alignment spoke and tab, alignment shelves on the alignment spokes, thickness gauge notches in the outside of the outer ring and reinforcement spokes between an inner ring and the outer ring at the location of the thickness gauge notches according to the present invention.

The fifteenth gasket embodiment 172 shown in FIG. 25 is substantially similar to the gasket 150 of FIG. 23, except that it includes a greater plurality of (i) open alignment spokes 156, and associated concavities 158, centering shelves 162 and inner spokes 77, and (ii) notches 112, and associated reinforcement spokes 154. It is to be recognized that any number of alignment spokes, together with associated structure, and whether the spokes are open or closed, may be used, without departing from the principles of the invention, provided that number is suitable for the installation. It is also to be recognized that any number of notches 112, and associated structure, may be used without departing from the principles of the invention, provided that number allows for measuring gasket thickness in a manner suitable for the installation.

Figure 26:
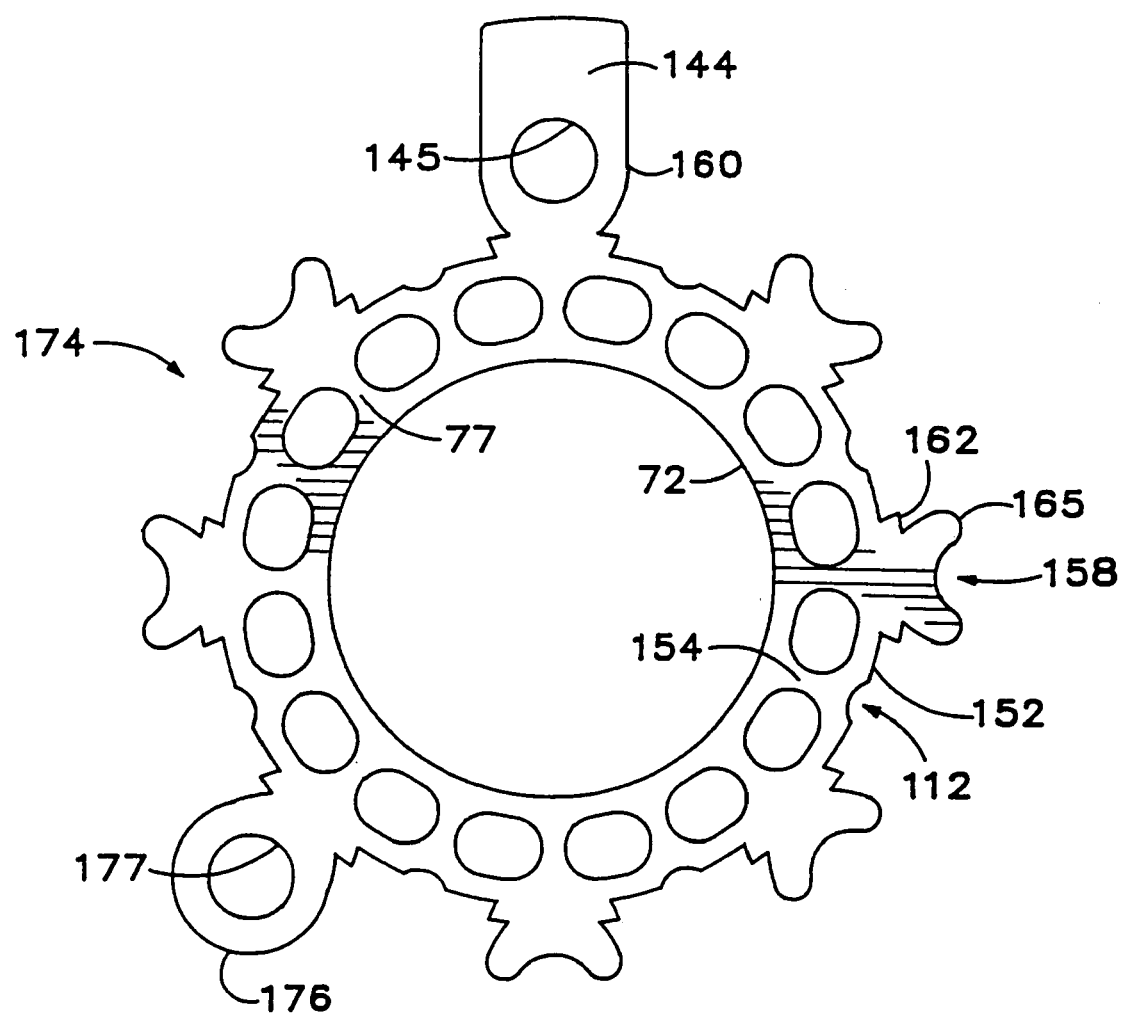
FIG. 26 shows a top view of a sixteenth embodiment of a gasket having an inset outer ring, open alignment spokes, a closed alignment spoke, a combined closed alignment spoke and tab, alignment shelves on the alignment spokes, thickness gauge notches in the outside of the outer ring and reinforcement spokes between an inner ring and the outer ring at the location of the thickness gauge notches according to the present invention.

The sixteenth gasket embodiment 174 shown in FIG. 26 is substantially similar to the gasket 172 of FIG. 25, except that it replaces one of the plurality of open alignment spokes 156 with a closed alignment spoke 176, the spoke 176 being shown without a tab 144 but having an aperture 177 for receiving a bolt. Closed alignment spoke 176 serves as a pivot for gasket 174 when it is being aligned by manipulation of the tab 144.

Figure 27:
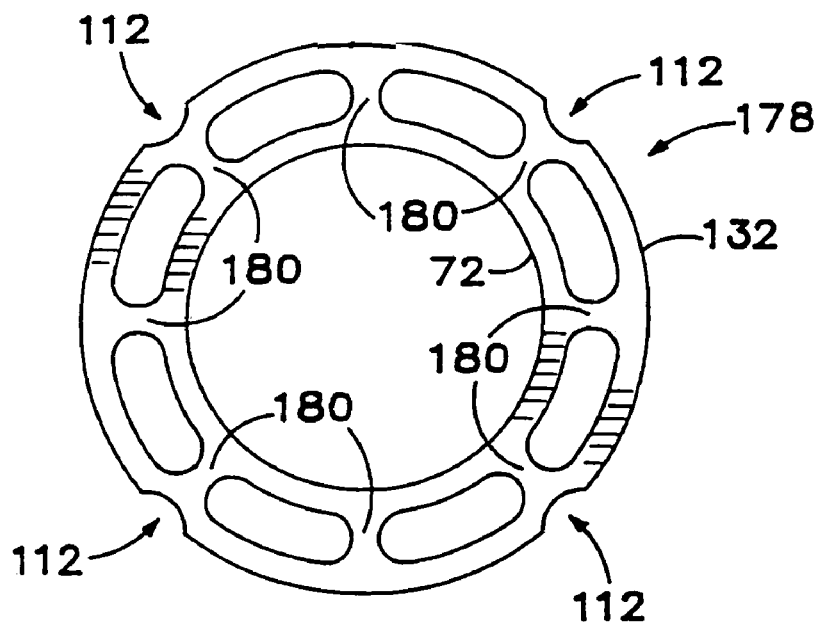
FIG. 27 shows a top view of a seventeenth embodiment of a gasket having an outer ring and an inner ring, thickness gauge notches in the outside of the outer ring and reinforcement spokes between the inner ring and the outer ring at the location of the notches according to the present invention.
Figure 28:
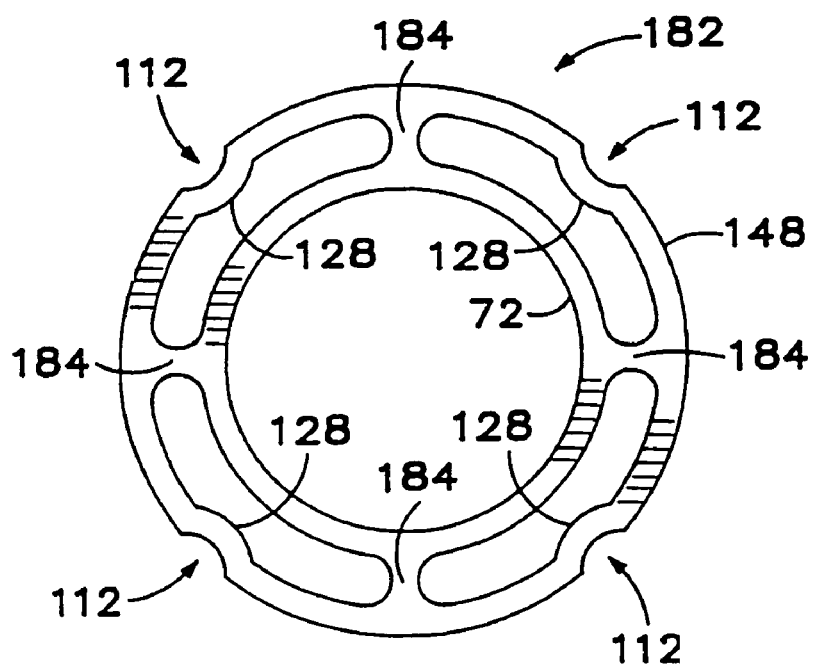
FIG. 28 shows a top view of an eighteenth embodiment of a gasket having an outer ring and an inner ring, thickness gauge notches in the outside of the outer ring and corresponding convexities on the inside of the outer ring according to the present invention.

The seventeenth gasket embodiment 178 shown in FIG. 27 is substantially similar to the gasket 136 in FIG. 19 except that its spokes 180 are not adapted for alignment. The eighteenth embodiment 182 shown in FIG. 28 is substantially similar to the gasket 146 in FIG. 22, except that its spokes 184 are not adapted for alignment. Both gasket 178 and gasket 182 are for use in a connection where the fasteners, such as bolts, lie entirely outside the outer ring of the gasket.

Figure 29:
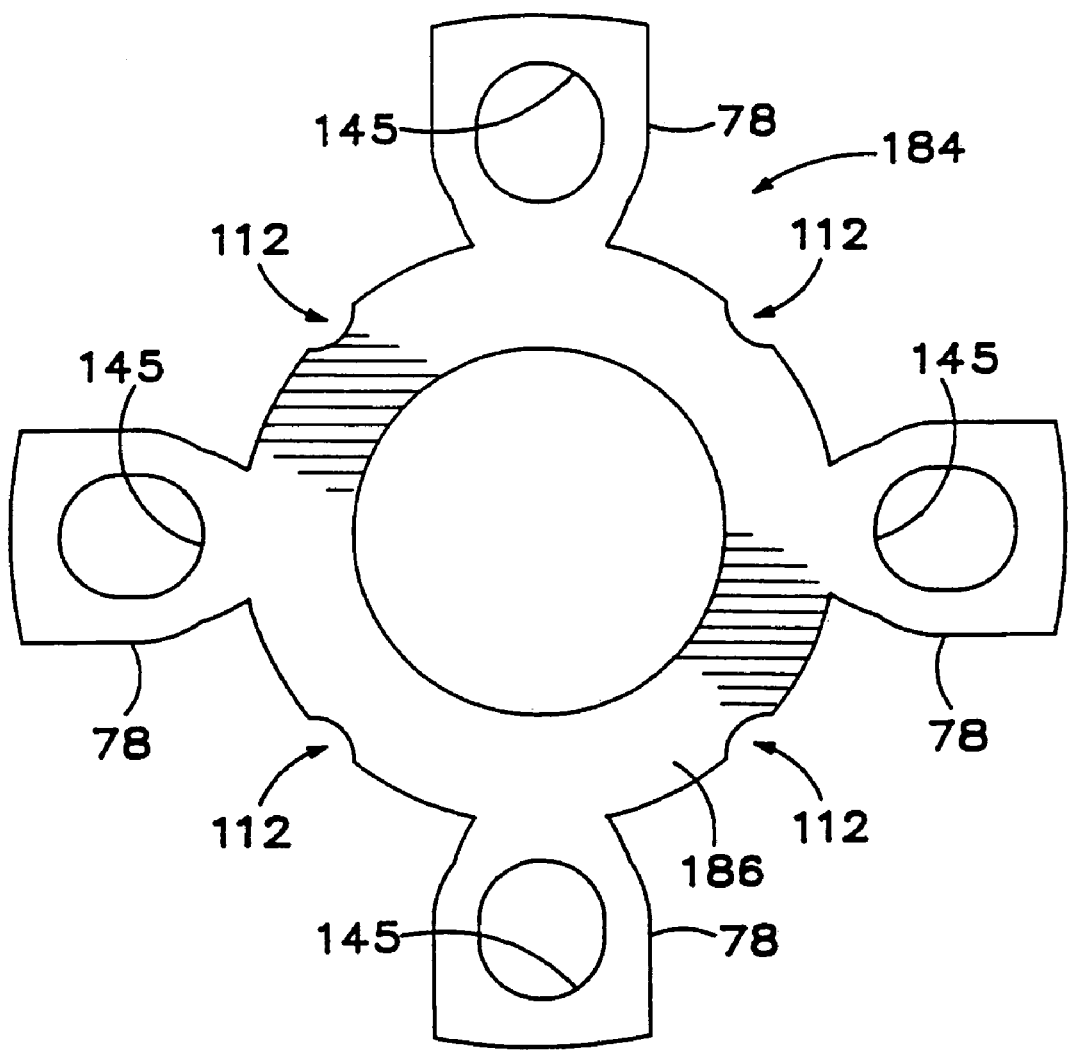
FIG. 29 shows a top view of a nineteenth embodiment of a gasket having a single ring, a plurality of closed alignment spokes and a plurality of thickness gauge notches in the outside of the ring according to the present invention.

FIG. 29 shows a nineteenth embodiment 184 of a gasket. It is substantially similar to the gasket 136 of FIG. 20, except that it has a single ring 186.

The terms and expressions which have been employed in the foregoing specification are employed therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A gasket for providing a seal at the joint between a pair of pipe flanges for connecting one flange to the other, comprising:
   a first stip of a material that is adapted for sealing which is formed in a loop and has an outer periphery;
   a second strip of said sealing material formed in a loop and having an inner periphery that is greater than the outer periphery of said first strip; and
   at least one spoke of said sealing material extending between said first strip and said second strip, wherein the outer periphery of said second strip includes a concave notch adapted for receiving a thickness gauge.

2. The gasket of claim 1, wherein the outer periphery of said second strip also includes, adjacent said notch, a corresponding convexity adapted for substantially maintaining the strength of said second strip at the location of said notch.

3. The gasket of claim 1, further comprising a reinforcement spoke extending between said first strip and said second strip and connecting to said second strip proximate the location of said notch.

4. A gasket for providing a seal at the joint between a pair of pipe flanges for connecting one flange to the other, comprising:
   a first strip of a material that is adapted for sealing and formed in a loop and having an outer periphery;
   a second strip of said sealing material formed in a loop and having an inner periphery that is greater than the outer periphery of said first strip; and
   at least one spoke of said sealing material extending between said first strip and said second strip wherein remaining spaces therebetween are substantially void, wherein said first and said second strips have corresponding inner peripheries, the gasket further comprising a third strip of said sealing material formed in a loop, said third strip having an outer periphery that is less than the inner periphery of said first strip, and at least one inner spoke of said sealing material extending between said third strip and said first strip.

5. A gasket for providing a seal at the joint between a pair of pipe flanges for connecting one flange to the other, comprising:
   a first strip of a material that is adapted for sealing which is formed in a loop has as an outer periphery;
   a second strip of said sealing material formed in a loop and having an inner periphery that is greater than the outer periphery of said first strip; and
   at least one spoke of said sealing material extending between said first strip and said second strip, the gasket further comprising an open alignment spoke of said sealing material extending outwardly from said second strip, said open alignment spoke defining an alignment concavity for placement adjacent a fastener.

6. The gasket of claim 5, further comprising a centering shelf of said sealing material depending from said open alignment spoke and extending so as to be substantially congruent with the outer periphery of at least one of the flanges.

7. The gasket of claim 6, wherein the flanges have corresponding inner and outer peripheries, wherein the outer periphery of one of the flanges is smaller than the outer periphery of the other of the flanges, wherein the outer periphery of said second strip is substantially congruent with the outer periphery of the smaller flange, and wherein said centering shelf extends so as to be substantially congruent with the outer periphery of the larger flange.

8. The gasket of claim 5, wherein said first and said second strips have corresponding inner peripheries, the gasket further comprising a third strip of said sealing material formed in a loop, said third strip having an outer periphery that is less than the inner periphery of said first strip, and at least one inner spoke of said sealing material extending between said third strip and said first strip.

9. The gasket of claim 5, further comprising a closed alignment spoke of said sealing material extending outwardly from said second strip, wherein said closed alignment spoke includes an aperture therethrough for receiving a bolt.

10. The gasket of claim 9, further comprising a centering shelf of said sealing material depending from at least one of said closed alignment spoke and said open alignment spoke and extending so as to be substantially congruent with the outer periphery of at least one of the flanges.

11. The gasket of claim 10, wherein the flanges have corresponding inner and outer peripheries, wherein the outer periphery of one of the flanges is smaller than the outer periphery of the other of the flanges, wherein the outer periphery of said second strip is substantially congruent with the outer periphery of the smaller flange, and wherein said centering shelf extends so as to be substantially congruent with the outer periphery of the larger flange.

12. The gasket of claim 9, wherein said first and said second strips have corresponding inner peripheries, the gasket further comprising a third strip of said sealing material formed in a loop, said third strip having an outer periphery that is less than the inner periphery of said first strip, and at least one inner spoke of said sealing material extending between said third strip and said first strip.

13. The gasket of claim 9, wherein said closed alignment spoke has a tab portion that extends beyond the outer peripheries of the flanges.

14. The gasket of claim 13, wherein said tab portion includes identification data.

15. A gasket for providing a seal at the joint between a pair of pipe flanges for connecting one flange to the other, comprising:
a first strip of a material that is adapted for sealing which is formed in loop and has an outer periphery;
a second strip of said sealing material formed in a loop and having an inner periphery that is greater than the outer periphery of said first strip; and
at least one spoke of said sealing material extending between said first strip and said second strip, further comprising an open alignment spoke of said sealing material extending outwardly from said second strip, said open alignment spoke defining an alignment concavity for placement adjacent a fastener, and wherein the outer periphery of said second strip includes a concave notch adapted for receiving a thickness gauge.

16. The gasket of claim 15, wherein the outer periphery of said second strip also includes, adjacent said notch, a corresponding convexity adapted for substantially maintaining the strength of said second strip at the location of said notch.

17. The gasket of claim 15, further comprising a reinforcement spoke extending between said first strip and said second strip and connecting to said second strip proximate the location of said notch.

18. A gasket for providing a seal at the joint between a pair of pipe flanges for connecting one flange to the other, comprising:
a first strip of a material that is adapted for sealing which is formed in a loop and has an outer periphery;
a second strip of said sealing material formed in a loop and having an inner periphery that is greater than the outer periphery of said first strip; and
at least one spoke of said sealing material extending between said first strip and said second strip, the gasket further comprising a closed alignment spoke of said sealing material extending outwardly from said second strip, wherein said closed alignment spoke includes an aperture therethrough for receiving a bolt.

19. The gasket of claim 18, further comprising a centering shelf of said sealing material depending from said closed alignment spoke and extending so as to be substantially congruent with the outer periphery of at least one of the flanges.

20. The gasket of claim 19, wherein the flanges have corresponding inner and outer peripheries, wherein the outer periphery of one of the flanges is smaller than the outer periphery of the other of the flanges, wherein the outer periphery of said second strip is substantially congruent with the outer periphery of the smaller flange, and wherein said centering shelf extends so as to be substantially congruent with the outer periphery of the larger flange.

21. The gasket of claim 18, wherein said first and said second strips have corresponding inner peripheries, the gasket further comprising a third strip of said sealing material formed in a loop, said third strip having an outer periphery that is less than the inner periphery of said first strip, and at least one inner spoke of said sealing material extending between said third strip and said first strip.

22. The gasket of claim 18, wherein said closed alignment spoke has a tab portion that extends beyond the outer peripheries of the flanges.

23. The gasket of claim 22, wherein said tab portion includes identification data.

24. A gasket for providing a seal at the joint between a pair of pipe flanges for connecting one flange to the other, comprising:
a first strip of a material that is adapted for sealing which is formed in loop and has an outer periphery;
a second strip of said sealing material formed in a loop and having an inner periphery that is greater than the outer periphery of said first strip; and
at least one spoke of said sealing material extending between said first strip and said second strip, further comprising a closed alignment spoke of said sealing material extending outwardly from said second strip, wherein said closed alignment spoke includes an aperture therethrough for receiving a bolt, and wherein the outer periphery of said second strip includes a concave notch adapted for receiving a thickness gauge.

25. The gasket of claim 24, wherein the outer periphery of said second strip also includes, adjacent said notch, a corresponding convexity adapted for substantially maintaining the strength of said second strip at the location of said notch.

26. The gasket of claim 24, further comprising a reinforcement spoke extending between said first strip and said second strip and connecting to said second strip proximate the location of said notch.

27. A gasket for providing a seal at the joint between a pair of pipe flanges for connecting one flange to the other, comprising:
a first strip of a material that is adapted for sealing which is formed in a loop and has an outer periphery;
a second strip of said sealing material formed in a loop and having an inner periphery that is greater than the outer periphery of said first strip; and
at least one spoke of said sealing material extending between said first strip and said second strip, further comprising an open alignment spoke of said sealing material extending outwardly from said second strip, said open alignment spoke defining an alignment concavity for placement adjacent a fastener, further comprising a closed alignment spoke of said sealing material extending outwardly from said second strip, wherein said closed alignment spoke includes an aperture therethrough for receiving a bolt, and wherein the outer periphery of said second strip includes a concave notch adapted for receiving a thickness gauge.

28. The gasket of claim 27, wherein the outer periphery of said second strip also includes, adjacent said notch, a corresponding convexity adapted for substantially maintaining the strength of said second strip at the location of said notch.

29. The gasket of claim 27, further comprising a reinforcement spoke extending between said first strip and said second strip and connecting to said second strip proximate the location of said notch.

30. A gasket for providing a seal at the joint between a pair of pipe flanges for connecting one flange to the other, comprising:
   a first strip of a material adapted for sealing which is formed in a loop and has an outer periphery;
   a second strip of said sealing material formed in a loop and having an outer periphery and an inner periphery greater than said outer periphery of said first strip; and
   at least one spoke of said sealing material extending between said first strip and said second strip, and wherein said outer periphery of said first strip is substantially circular and said outer periphery of said second strip is substantially square, wherein said outer periphery of said second strip defines a concavity at a respective corner thereof.

31. A gasket for providing a seal at the joint between a pair of pipe flanges for connecting one flange to the other, comprising:
   a first strip of sealing material adapted for sealing and formed in a loop and having an outer periphery;
   a second strip of said sealing material formed in a loop and having an outer periphery and an inner periphery greater than said outer periphery of said first strip; and
   at least one spoke of said sealing material extending between said first strip and said second strip, further comprising at least one closed alignment spoke of said sealing material extending outwardly from said second strip, said alignment spoke including an aperture therethrough for receiving a bolt.

32. A gasket for providing a seal at the joint between a pair of pipe flanges for connecting one flange to the other, each flange having an inner periphery and an outer periphery, comprising a single ring of sealing material having an outer periphery that is substantially congruent with the outer periphery of at least one of the flanges and including a concave notch adapted for receiving a thickness gauge.

33. The gasket of claim 32, wherein the outer periphery of one of the flanges is greater than the outer periphery of the other of the flanges, and wherein said outer periphery of said sealing material is less than the outer periphery of the one of the flanges that has the greatest outer periphery.

34. The gasket of claim 33, wherein said sealing material includes an aperture therethrough for receiving a respective bolt.

35. A gasket for providing a seal at the joint between a pair of pipe flanges for connecting one flange to the other, each flange having an inner periphery and an outer periphery, comprising:
   a first strip of a material adapted for sealing and formed in a loop, said first strip has an outer periphery;
   a second strip of said sealing material formed in a loop, said second strip having an outer periphery and an inner periphery greater than the outer periphery of said first strip; and
   at least one spoke of said sealing material extending between said first strip and said second strip at a predetermined location on the inner periphery of said second strip, wherein the outer periphery of said second strip includes a concave notch adapted for receiving a thickness gauge, said notch being disposed proximate said predetermined location.

36. A gasket for providing a seal at the joint between a pair of pipe flanges for connecting one flange to the other, each flange having an inner periphery and an outer periphery, comprising:
   a first strip of a material adapted for sealing and formed in a loop, said first strip having an outer periphery;
   a second strip of said sealing material formed in a loop, said second strip having an outer periphery and an inner periphery greater than the outer periphery of said first strip; and
   at least one spoke of said sealing material extending between said first strip and said second strip, wherein the outer periphery of said second strip includes a concave notch adapted for receiving a thickness gauge, and wherein the outer periphery of said second strip also includes, opposite said notch, a corresponding convexity adapted for substantially maintaining the strength of said second strip at the location of said notch.

* * * * *